US008687942B2

(12) United States Patent
Mae et al.

(10) Patent No.: US 8,687,942 B2
(45) Date of Patent: Apr. 1, 2014

(54) DATA PROCESSING APPARATUS, DATA PROCESSING METHOD, DATA PROCESSING PROGRAM, RECORDING APPARATUS, RECORDING METHOD, AND RECORDING PROGRAM

(75) Inventors: Atsushi Mae, Kanagawa (JP); Kenichiro Aridome, Kanagawa (JP); Yukio Isobe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1346 days.

(21) Appl. No.: 12/050,556

(22) Filed: Mar. 18, 2008

(65) Prior Publication Data

US 2008/0304813 A1    Dec. 11, 2008

(30) Foreign Application Priority Data

May 29, 2007   (JP) ................................. 2007-141315

(51) Int. Cl.
*G06F 17/30*  (2006.01)
*H04N 9/80*   (2006.01)
*H04N 5/781*  (2006.01)
*H04N 7/00*   (2011.01)

(52) U.S. Cl.
USPC .......................................... 386/248; 386/241

(58) Field of Classification Search
USPC ..................... 386/124, 241, 248; 707/104.1
See application file for complete search history.

(56) References Cited

U.S. PATENT DOCUMENTS

| | | | |
|---|---|---|---|
| 6,711,587 B1 * | 3/2004 | Dufaux | 1/1 |
| 2005/0008346 A1 * | 1/2005 | Noguchi et al. | 386/125 |
| 2007/0047911 A1 * | 3/2007 | Haruki | 386/95 |

FOREIGN PATENT DOCUMENTS

| | | | |
|---|---|---|---|
| EP | 1760718 A2 * | 3/2007 | |
| JP | 2002-245717 A | 8/2002 | |
| JP | 2003-283993 A | 10/2003 | |
| JP | 2004-127471 A | 4/2004 | |
| JP | 2007-184013 A | 7/2007 | |

OTHER PUBLICATIONS

Japanese Office Action issued on Mar. 15, 2011 in corresponding Japanese Application No. 2007-141315.

* cited by examiner

*Primary Examiner* — Brian Shaw
(74) *Attorney, Agent, or Firm* — Oblon, Spivak, McClelland, Maier & Neustadt, L.L.P.

(57) ABSTRACT

A data processing apparatus which divides stream data into portions is disclosed. An evaluation value calculating section calculates an evaluation value at a dividing candidate position of the stream data based on an evaluation function. A comparing section compares the evaluation value calculated by the evaluation value calculating section with a predetermined threshold value. A dividing candidate position obtaining section obtains the dividing candidate position of the stream data in each predetermined unit. A controlling section decides a dividing position of the stream data based on a compared result of the comparing section. A controlling section causes the dividing candidate position obtaining section to obtain a second dividing candidate position when the compared result of the comparing section denotes that the evaluation value at the first dividing candidate position does not exceed the threshold value.

39 Claims, 15 Drawing Sheets

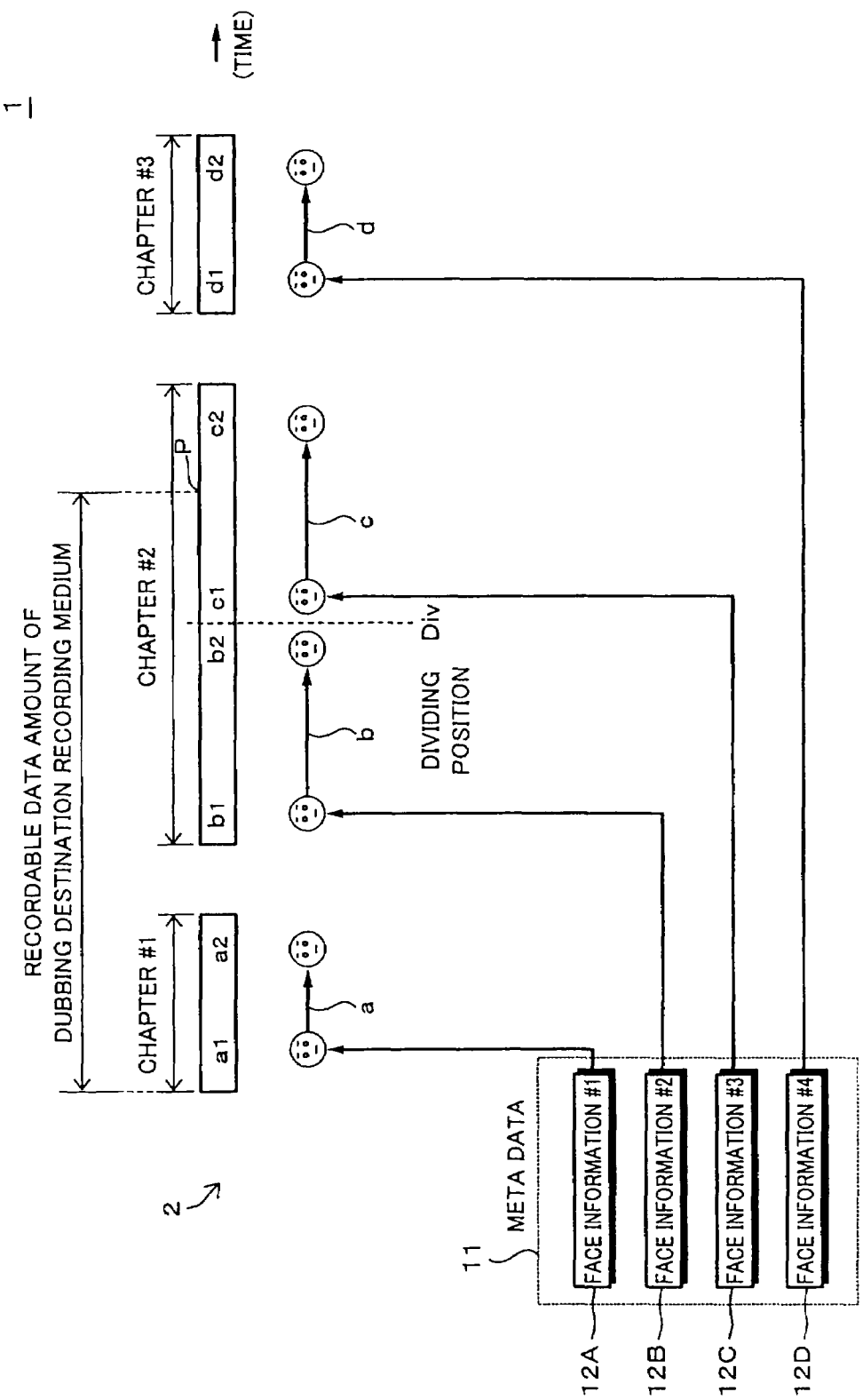

Fig. 6

| (TYPE) | | EVALUATION FUNCTION f(x) | THRESHOLD VALUE |
|---|---|---|---|
| MOVING IMAGE | | 1 / (NUMBER OF FACES DETECTED AT DIVIDING POSITION + 1) + (1 AT CHAPTER BOUNDARY) | 1 |
| | | 1 / (NUMBER OF FACES DETECTED AT DIVIDING POSITION + 1) + (1 AT CHAPTER BOUNDARY) + (1 AT CHANGE POINT OF NUMBER OF FACES DETECTED) | 1 |
| | | 1 AT POSITION WHERE DETECTION OF SMILING FACE STARTS | 1 |
| | | 1 WHEN PARTICULAR PERSON IS DETECTED | 1 |
| AUDIO | | DURATION OF SOUND VOLUME OF 30 dB OR LESS / 10 SECONDS | 1 |
| | | 1 AT POSITION WHERE DETECTION OF SMILING FACE STARTS | 1 |
| OTHER | | 1 WHEN VIDEO DATA/AUDIO DATA ARE AT LOW BIT RATE | 1 |
| | | 1 WHEN REPRODUCTION DURATION FROM BEGINNING OF CHAPTER AND REPRODUCTION DURATION FROM END ARE BOTH 10 MINUTES OR MORE + (1 AT CHAPTER BOUNDARY) | 1 |

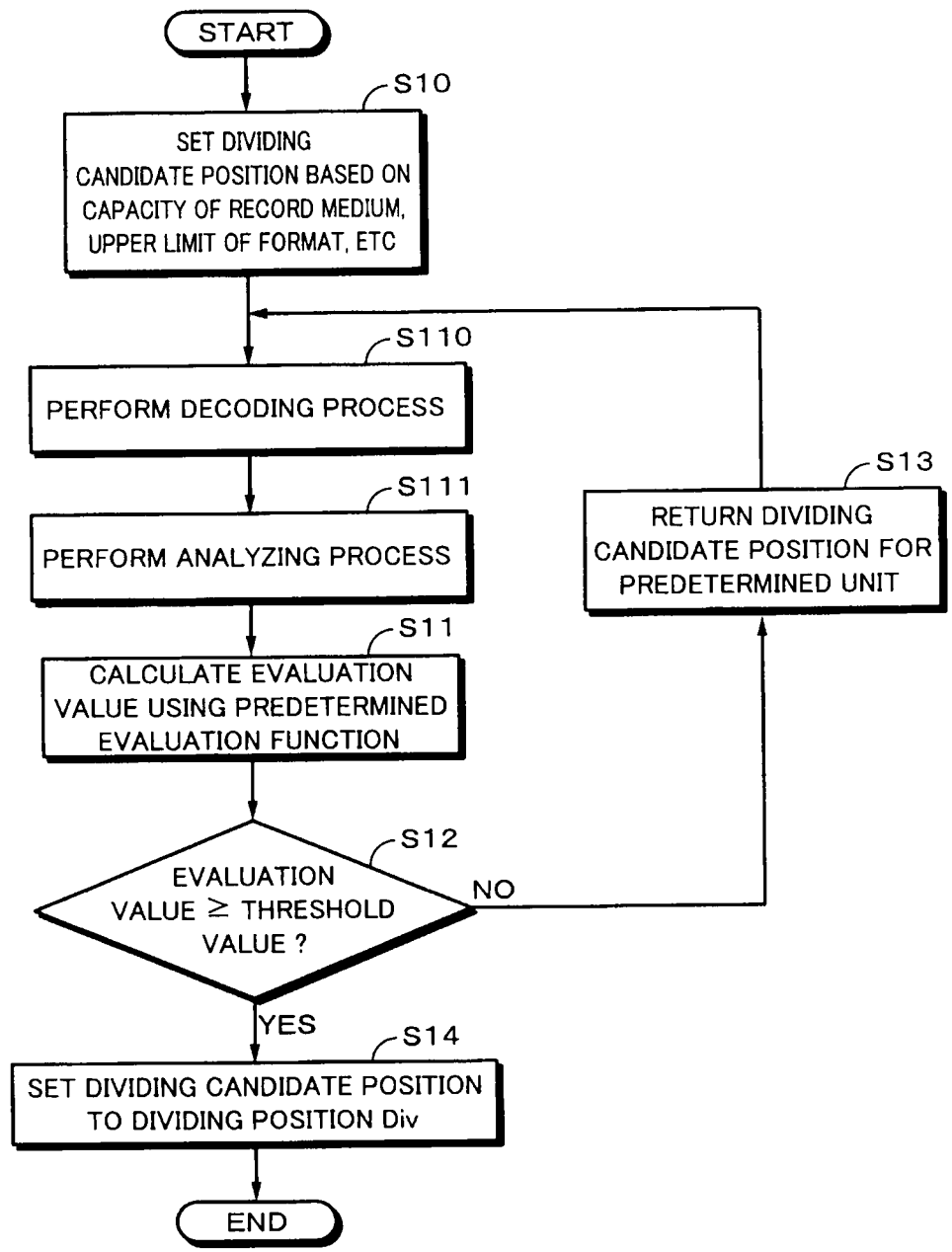

DATA PROCESSING APPARATUS, DATA PROCESSING METHOD, DATA PROCESSING PROGRAM, RECORDING APPARATUS, RECORDING METHOD, AND RECORDING PROGRAM

CROSS REFERENCES TO RELATED APPLICATIONS

The present invention contains subject matter related to Japanese Patent Application JP 2007-141315 filed in the Japanese Patent Office on May 29, 2007, the entire contents of which being incorporated herein by reference.

BACKGROUND OF THE INVENTION

1. Field of the Invention

The present invention relates to a data processing apparatus, a data processing method, a data processing program, a recording apparatus, a recording method, and a recording program that perform processes of dividing content data recorded in a large capacity record medium into portions and dubbing them to a plurality of record mediums.

2. Description of the Related Art

In recent years, apparatus that can dub content data composed of, for example, moving image data, recorded in a record medium to another record medium have increasingly become common. Such apparatus that can dub content data have a built-in large capacity record medium. These apparatus are generally used in such a manner that by dubbing content data recorded in this built-in record medium to a detachable record medium (referred to as a removable medium), content data are carried out and archived.

Japanese Patent Application Laid-Open No. 2006-344321 (hereinafter referred to as patent document 1) describes a recording apparatus that uses as record mediums a built-in hard disk and a recordable DVD.

In general, the record capacities of the built-in record mediums are much larger than those of removable mediums. In recent years, there has been a tendency of which the bit rates of moving image data are increasing as image resolutions are increasing. Thus, the number of titles of content data that are difficult to be recorded in one removable medium is increasing.

As an example, a recording apparatus has a hard disk having a record capacity of several 10 GB (Giga Bytes) to 100 GB or more as a built-in record medium and dubs content data recorded in the built-in hard disc, for example, to a recordable DVD or an attachable/detachable nonvolatile semiconductor memory.

Several specifications with respect to dubbing control for the case that dubbing source content data are unable to be recorded to one record medium, for example, the data capacity of dubbing source content data is larger than the record capacity of a removable medium of the dubbing destination have been proposed.

As a first example, when dubbing source content data is unable to be recorded in one dubbing destination removable medium, the dubbing operation may be prohibited. In this case, the user is informed that since the data capacity of dubbing source content data is larger than the record capacity of the dubbing destination removable medium, the dubbing operation is prohibited and is prompted to divide content data.

As a second example, the apparatus side may divide content data corresponding to the record capacity of a removable medium and dub the divided portions of the content data to a plurality of removable mediums. In this case, content data are dubbed to the first removable medium corresponding to its record capacity and the user is informed that since dubbing operation is being suspended, an additional removable medium is necessary to continue.

SUMMARY OF THE INVENTION

In the foregoing first example, the user is necessary to manually divide content data such that they can be recorded to one record medium. Thus, as a problem of the first example, it was bothersome to the user. As another problem, the user was difficult to know a recordable boundary of content data to one removable medium and was not easy to know at what position to divide content data.

In the foregoing second example, since the apparatus side automatically decides the dividing positions of content data, with respect to setting of dividing positions, the user is not necessary to perform bothersome operations. However, in this second example, since the dividing positions are automatically set, there was a problem of which it was likely that removable mediums were necessary to be changed at an important position of content data. When content data are, for example, moving image data, a situation of which a dividing position is set in the middle of a moving scene and removable mediums are necessary to be changed may occur.

In view of the foregoing, it would be desirable to provide a data processing apparatus, a data processing method, a data processing program, a recording apparatus, a recording method, and a recording program that properly set dividing positions of content data that are automatically divided and dubbed to a plurality of removable mediums.

According to an embodiment of the present invention, there is provided a data processing apparatus which divides stream data into portions. The data processing apparatus includes an evaluation value calculating section, a comparing section, a dividing candidate position obtaining section, a controlling section. The evaluation value calculating section calculates an evaluation value at a dividing candidate position of the stream data based on an evaluation function. The comparing section compares the evaluation value calculated by the evaluation value calculating section with a predetermined threshold value. The dividing candidate position obtaining section obtains the dividing candidate position of the stream data in each predetermined unit. The controlling section decides a dividing position of the stream data based on a compared result of the comparing section. The controlling section causes the dividing candidate position obtaining section to obtain a second dividing candidate position when the compared result of the comparing section denotes that the evaluation value at the first dividing candidate position does not exceed the threshold value. The controlling section decides a dividing position of the stream data based on the first dividing candidate position when the evaluation value at the first dividing candidate position exceeds the threshold value.

According to an embodiment of the present invention, there is provided a data processing method of dividing stream data into portions. An evaluation value is calculated at a dividing candidate position of the stream data based on an evaluation function. The evaluation value calculated at the evaluation value calculating step is compared with a predetermined threshold value. The dividing candidate position of the stream data is obtained in each predetermined unit. A dividing position of the stream data is decided based on a compared result at the comparing step. The deciding step is performed by obtaining a second dividing candidate position at the dividing candidate position obtaining step when the compared result at the comparing step denotes that the evaluation value at the first dividing candidate position does not exceed the threshold value. The deciding step is performed by deciding a dividing position of the stream data based on the first dividing candidate position when the evaluation value at the first dividing candidate position exceeds the threshold value.

According to an embodiment of the present invention, there is provided a data processing program which causes a computer to execute a data processing method of dividing stream data into portions. An evaluation value is calculated at a dividing candidate position of the stream data based on an evaluation function. The evaluation value calculated at the evaluation value calculating step is compared with a predetermined threshold value. The dividing candidate position of the stream data is obtained in each predetermined unit. A dividing position of the stream data is decided based on a compared result at the comparing step. The deciding step is performed by obtaining a second dividing candidate position at the dividing candidate position obtaining step when the compared result at the comparing step denotes that the evaluation value at the first dividing candidate position does not exceed the threshold value. The deciding step is performed by deciding a dividing position of the stream data based on the first dividing candidate position when the evaluation value at the first dividing candidate position exceeds the threshold value.

According to an embodiment of the present invention, there is provided a recording apparatus which dubs stream data recorded in a record medium to another record medium. The recording apparatus includes a reproducing section, a recording section, an evaluation value calculating section, a comparing section, a dividing candidate position obtaining section, and a controlling section. The reproducing section reproduces data from a first record medium fixedly used in a housing of the recording apparatus. The recording section records data to a second record medium which is attachable and detachable to the recording apparatus. The evaluation value calculating section sets a dividing candidate position to stream data reproduced from the first record medium within a recordable data capacity of the second record medium and calculates an evaluation value at the dividing candidate position of the stream data based on an evaluation function. The comparing section compares the evaluation value calculated by the evaluation value calculating section with a predetermined threshold value. The dividing candidate position obtaining section obtains the dividing candidate position of the stream data in each predetermined unit. The controlling section decides a dividing position of the stream data based on a compared result of the comparing section and controls the reproducing section and the recoding section to dub the stream data recorded in the first record medium to the second record medium for a length corresponding to the dividing position. The controlling section causes the dividing candidate position obtaining section to obtain a second dividing candidate position earlier than the first dividing candidate position of the stream data when the compared result of the comparing section denotes that the evaluation value at the first dividing candidate position does not exceed the threshold value. The controlling section decides a dividing position of the stream data based on the first dividing candidate position when the evaluation value at the first dividing candidate position exceeds the threshold value.

According to an embodiment of the present invention, there is provided a recording method of dubbing stream data recorded in a record medium to another record medium. Data are reproduced from a first record medium fixedly used in a housing. Data are recorded to a second record medium which is attachable and detachable. A dividing candidate position is set to stream data reproduced from the first record medium within a recordable data capacity of the second record medium and an evaluation value is calculated at the dividing candidate position of the stream data based on an evaluation function. The evaluation value calculated at the setting step is compared with a predetermined threshold value. The dividing candidate position of the stream data is obtained in each predetermined unit. A dividing position of the stream data is decided based on a compared result at the comparing step and the reproducing step and the recoding step are controlled to dub the stream data recorded in the first record medium to the second record medium for a length corresponding to the dividing position. The deciding step is performed by obtaining a second dividing candidate position earlier than the first dividing candidate position of the stream data at the deciding step when the compared result at the comparing step denotes that the evaluation value at the first dividing candidate position does not exceed the threshold value. The deciding step is performed by deciding a dividing position of the stream data based on the first dividing candidate position when the evaluation value at the first dividing candidate position exceeds the threshold value.

According to an embodiment of the present invention, there is provided a recording program which causes a computer to execute a recording method of dubbing stream data recorded in a record medium to another record medium. Data are reproduced from a first record medium fixedly used in a housing. Data are recorded to a second record medium which is attachable and detachable. A dividing candidate position is set to stream data reproduced from the first record medium within a recordable data capacity of the second record medium and an evaluation value is calculated at the dividing candidate position of the stream data based on an evaluation function. The evaluation value calculated at the setting step is compared with a predetermined threshold value. The dividing candidate position of the stream data is obtained in each predetermined unit. A dividing position of the stream data is decided based on a compared result at the comparing step and the reproducing step and the recoding step are controlled to dub the stream data recorded in the first record medium to the second record medium for a length corresponding to the dividing position. The deciding step is performed by obtaining a second dividing candidate position earlier than the first dividing candidate position of the stream data at the deciding step when the compared result at the comparing step denotes that the evaluation value at the first dividing candidate position does not exceed the threshold value. The deciding step is performed by deciding a dividing position of the stream data based on the first dividing candidate position when the evaluation value at the first dividing candidate position exceeds the threshold value.

As described above, according to embodiments of the present invention, an evaluation value and a threshold value are compared at a dividing candidate position of stream data calculated based on an evaluation function. When the compared result denotes that the evaluation value exceeds the threshold value, a dividing position of the stream data is decided based on the dividing candidate position. When the determined result denotes that the evaluation value does not exceed the threshold value, another dividing candidate position is obtained. Thus, when the evaluation value is properly set, the dividing position of the stream data can be properly decided.

In addition, according to embodiments of the present invention, a dividing candidate position is set to stream data reproduced from a first record medium fixedly used in a housing such that the data capacity at the dividing candidate position does not exceed the recordable data capacity of an attachable/detachable second record medium. An evaluation value and a threshold value are compared at the dividing candidate position of the stream data calculated based on an evaluation function. When the compared result denotes that the evaluation value exceeds the threshold value, a dividing position of the stream data is decided based on the dividing candidate position. When the determined result denotes that the evaluation value does not exceed the threshold value, a dividing candidate position earlier than the current dividing candidate position is obtained. The stream data recorded in the first record medium are dubbed to the second record medium until the dividing position is detected. Thus, when the evaluation function is properly set, the stream data recorded in the first record medium can be appropriately dubbed to the second record medium based on the decided dividing position.

As described above, according to embodiments of the present invention, an evaluation value and a threshold value are compared at a dividing candidate position of stream data calculated based on an evaluation function. When the compared result denotes that the evaluation value exceeds the threshold value, a dividing position of the stream data is decided based on the dividing candidate position. When the determined result denotes that the evaluation value does not exceed the threshold value, another dividing candidate position is obtained. Thus, when the evaluation value is properly set, an effect of which the dividing position of the stream data can be properly decided can be obtained.

In addition, according to embodiments of the present invention, a dividing candidate position is set to stream data reproduced from a first record medium fixedly used in a housing such that the data capacity at the dividing candidate position does not exceed the recordable data capacity of an attachable/detachable second record medium. An evaluation value and a threshold value are compared at the dividing candidate position of the stream data calculated based on an evaluation function. When the compared result denotes that the evaluation value exceeds the threshold value, a dividing position of the stream data is decided based on the dividing candidate position. When the determined result denotes that the evaluation value does not exceed the threshold value, a dividing candidate position earlier than the current dividing candidate position is obtained. The stream data recorded in the first record medium are dubbed to the second record medium until the dividing position is detected. Thus, when the evaluation function is properly set, an effect of which the stream data recorded in the first record medium can be appropriately dubbed to the second record medium based on the decided dividing position can be obtained.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 2 is a schematic diagram describing an outline of the dividing position deciding method according to the first embodiment of the present invention;

FIG. 6 is a schematic diagram showing examples of evaluation functions f(x) and threshold values to evaluation values calculated therefrom;

FIG. 15 is a flow chart showing an example of a process of setting dividing position Div performed during an image analyzing process and an audio analyzing process for dubbing source content data.

DETAILED DESCRIPTION OF THE PREFERRED EMBODIMENTS

Figure 1:
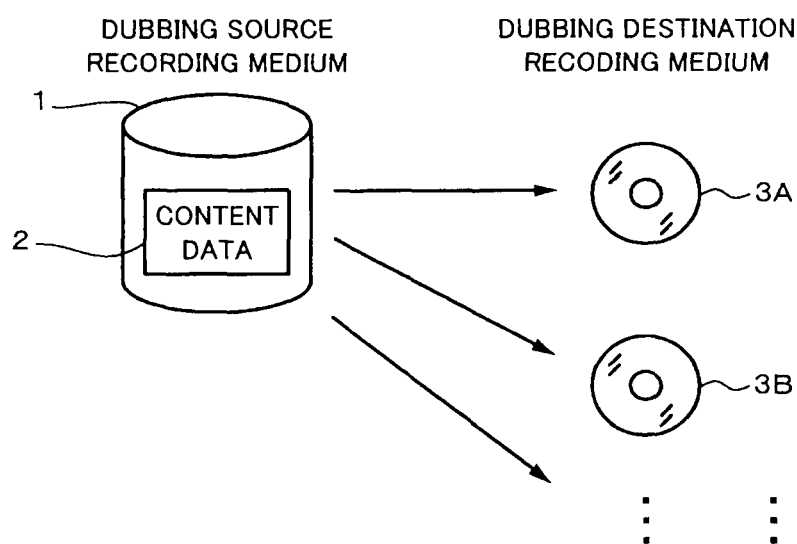
FIG. 1 is a schematic diagram describing an outline of a dividing position deciding method according to a first embodiment of the present invention.
Figure 3A:
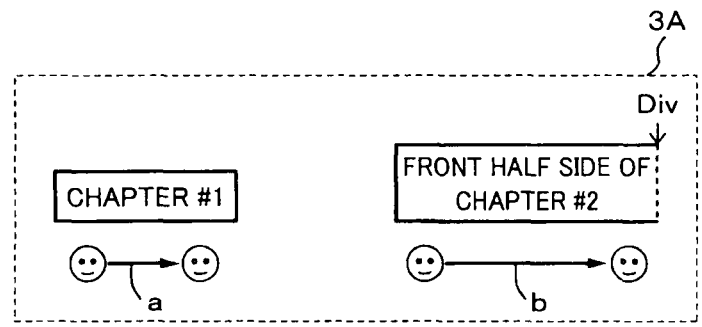
FIG. 3A and FIG. 3B are schematic diagrams describing an outline of the dividing position deciding method according to the first embodiment of the present invention.
Figure 3B:
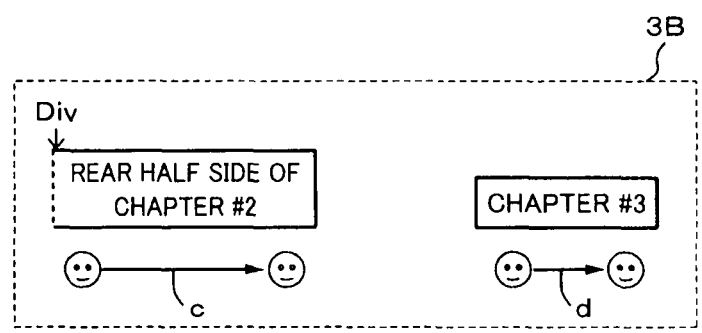

Next, with reference to the accompanying drawings, a first embodiment of the present invention will be described. In the first embodiment of the present invention, when there is a necessity of dividing content data, for example, dubbing of content data, a dividing position is set taking into account of the record capacity of a dubbing destination record medium and based on an evaluation value calculated corresponding to the content data.

Evaluation values are set to smaller values or 0 at positions where content data are not caused to be divided, whereas evaluation values are set to larger values at positions where content data can be divided. Since a final dividing position is obtained on the basis of the evaluation values, a situation of which content data are divided in the middle of a series of scenes can be prevented.

Next, with reference to FIG. 1, FIG. 2, FIG. 3A, and FIG. 3B, a method of deciding a dividing position according to the first embodiment of the present invention will be described. As exemplified in FIG. 1, it is assumed that content data 2, for example, composed of moving image data, recorded in a dubbing source record medium 1 are divided and dubbed to dubbing destination recording mediums 3A, 3B, and so forth.

For example, it is assumed that the dubbing source record medium 1 has a record capacity of several 10 GB to several 100 GB or more and is a record medium that is fixedly used in the apparatus such as a hard disk and that the dubbing destination record mediums 3A, 3B, and so forth are optical discs such as recordable DVDs (Digital Versatile Discs). When the dubbing destination record mediums 3A, 3B, and so forth are recordable optical discs, they are 12-cm diameter, single-layered, and around 4.7 GB record capacity type discs. The record capacity of the record mediums 3A, 3B, and so forth are much smaller than that of the record medium 1 that is a hard disk.

FIG. 2 shows an example of a method of dividing the content data 2 recorded in the record medium 1 according to the first embodiment of the present invention. In addition to the content data 2, meta data 11 corresponding to the content data 2 are recorded to the record medium 1. In the example shown in FIG. 2, the content data 2 are composed of a plurality of chapters #1, #2, and #3.

In this example, a reproduction unit of content data viewed from the user is referred to as a chapter and it is assumed that a chapter is defined by a mark that is set to one title of moving image data. For example, it is assumed that marks are necessarily set to the beginning and end of each title of moving image data and that a predetermined mark can be set to a reproduction startable position. With adjacent marks, a chapter is defined. The user can define a reproduction position of content data in the unit of a chapter. Information that represents marks may be contained in a file of moving image data. Instead, the information may be contained in a file associated with a moving image data file. In addition, chapters may be independent moving image data files.

In the example shown in FIG. 2, the meta data 11 contain face information 12A, 12B, 12C, and 12D based on images of human faces detected from moving image data of the content data 2. For example, face images are detected from frames of moving image data of the content data 2. A start frame and an end frame of a series of frames of a face image are contained as one record of face information in the meta data 11 to manage face detection start position and face detection end position. A method of detecting face images from moving image data will be described later.

In the example shown in FIG. 2, in chapter #1, at position $a_1$, the detection of a face image is started. In region a, the face image is continuously detected. At position $a_2$, the detection of the face image is stopped. Information of position $a_1$ and position $a_2$ is face information 12A. In chapter #2, at position $b_1$, the detection of a face image is started. In region b, a face image is continuously detected. At position $b_2$, the detection of the face image is stopped. Information of position $b_1$ and position $b_2$ is face information 12B. In chapter #2, at position $c_1$, a face image is detected. In region c, a face image is continuously detected. At position $c_2$, the detection of the face image is stopped. Information of position $c_1$ and position $c_2$ is face information 12C. In chapter #3, at position $d_1$, the detection of a face image is started. In region d, the face image is continuously detected. At position $d_2$, the detection of the face image is stopped. Information of position $d_1$ and position $d_2$ is face information 12D.

As exemplified in FIG. 2, it is assumed that the data amount of the whole chapter 1 and the region from the beginning of chapter #2 to position P of chapter #2 corresponds to the data capacity of the dubbing destination record medium (record medium 3A). In the past, chapter #2 was divided at position P. The whole chapter #1 and the region from the beginning of chapter #2 to position P were dubbed to the record medium 3A. The region after position P of chapter #2 was dubbed to the next record medium 3B. In this method, the dubbing is suspended in the middle of region c of chapter #2 where a face image is continuously detected and the dubbing destination record medium is changed.

In the first embodiment of the present invention, a dividing position is returned from position P to a position between position $b_2$ and position $c_1$ where the detection of a face image is stopped and this position is set as dividing position Div. As exemplified in FIG. 3A, the whole chapter #1 and the region from the beginning of chapter #2 to dividing position Div of chapter #2 are recorded to the dubbing destination recording medium 3A. As exemplified in FIG. 3B, the region from dividing position Div to the end of chapter #2 is recorded to the next dubbing destination recording medium 3B. Thus content data can be divided and dubbed to a plurality of record mediums without necessity of dividing a series of scenes.

In the foregoing example, face information is generated only on the basis of whether or not a face image is detected. However, it is further preferred that a face identifying process be performed on the basis of a detected face image. For example, as exemplified in FIG. 4, person E, person F, and person G can be identified on the basis of detected face images and face information can be generated on the basis of the identified persons. In addition, as exemplified in FIG. 4, a face detection start position and a face detection end position as face information can be managed such that regions of records of face information overlap with each other. In addition, a plurality of different sets of face detection start positions and face detection end positions can be managed for the same person (person E in the example of FIG. 4).

Figure 4:
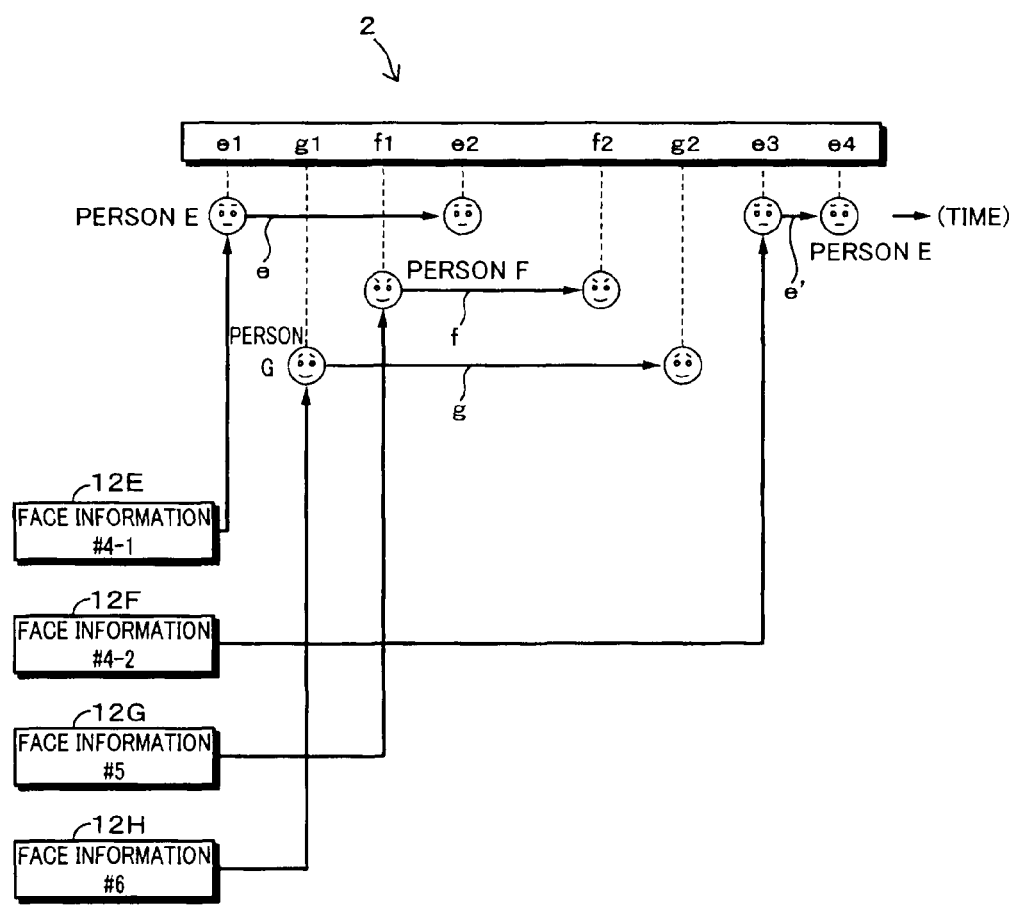
FIG. 4 is a schematic diagram describing the case of which a plurality of different face images have been detected.

In the example shown in FIG. 4, at position $e_1$, the detection of a face image of person E is started. In region e, the face image is continuously detected. At position $e_2$, the detection of the face image is stopped. In addition, at position $e_3$, the detection of a face image of persons E is started. At position $e_4$, the detection of the face image is stopped through region e'. For person E, information of positions $e_1$ and $e_2$ is managed as face information 12E and information of positions $e_3$ and $e_4$ is managed as face information 12F. At position $f_1$, the detection of a face image of person F is started. In region f, the face image is continuously detected. At position $f_2$, the detection of the face image is stopped. For person F, information of positions $f_1$ and $f_2$ is managed as face information 12G. Likewise, at position $g_1$, the detection of a face images of person G is started. In region g, the face image is continuously detected. At position $g_2$, the detection of the face image is stopped. For person G, information of position $g_1$ and position $g_2$ is managed as face information 12H.

In addition, in the region from position $g_1$ to position $f_1$, person E and person G are doubly detected. In addition, in the region from position $f_1$ to position $e_2$, person E, person F, and person G are triply detected. In addition, in the region from position $e_2$ to position $f_2$, person F and person G are doubly detected. These overlap regions can be managed on the basis of face information 12E to 12H.

Next, with reference to both a flow chart shown in FIG. 5 and the foregoing FIG. 2, an example of a process of setting dividing position Div to content data according to the first embodiment of the present invention will be described. In the first embodiment, an evaluation value of content data composed of moving image data is obtained at predetermined intervals using predetermined evaluation function $f(x)$, the evaluation value is compared with a threshold value, and dividing position Div is set on the basis of the compared result. Although details of evaluation function $f(x)$ will be described later, in this example, evaluation function $f_1(x)$ of obtaining an evaluation value on the basis of the number of face images that have been detected is used.

Evaluation function f1(x) can be defined, for example, as formula (1).

$$f_1(x)=1/(\text{number of faces detected at position}+1)+(1 \text{ at chapter boundary}) \quad (1)$$

According to this formula (1), when at least one face image is detected at a position where content data are evaluated, the value of evaluation function $f_1(x)$ is smaller than 1 (when the position is not a chapter boundary). Thus, when the threshold value is 1, a position at which a face image is not detected can be obtained.

Figure 5:
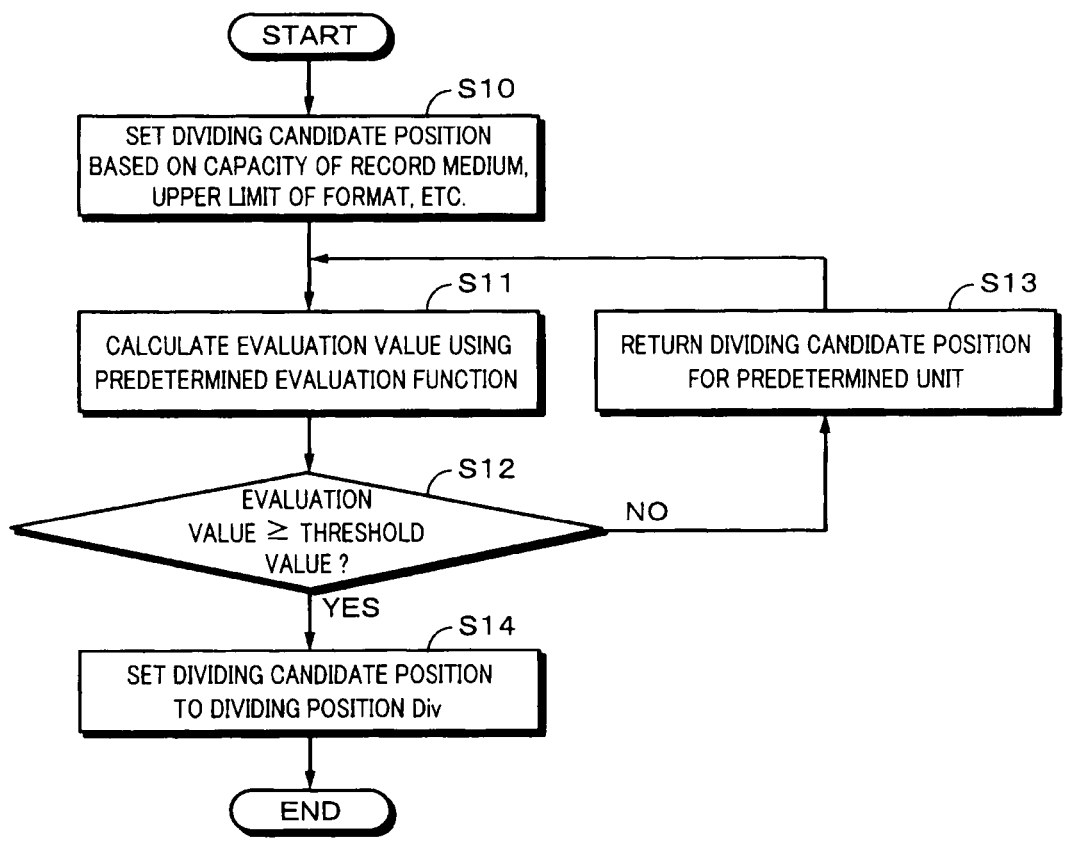
FIG. 5 is a flow chart showing an example of a setting process of dividing position Div to content data according to the first embodiment of the present invention.

Returning to the description of FIG. 5, at the first step S10, an initial value of a dividing candidate position of content data is set on the basis of the record capacity of a dubbing destination record medium, the upper limit value defined in the format applied to the record medium, and so forth. In the example shown in FIG. 2, position P corresponding to the data amount of content data that can be recorded to the dubbing destination record medium is the initial dividing candidate position of the content data 2. Instead, the initial dividing candidate position may be another position as long as the initial dividing candidate position is in the range of the data amount of content data that can be recorded to the dubbing destination record medium.

At the next step S11, an evaluation value at the position that has been set as the dividing candidate position is calculated using evaluation function f(x). FIG. 2 shows that position P is present between position $c_1$ and position $c_2$, namely in region c, one face image is detected, and position P is not a chapter boundary based on face information 12C. Thus, based on formula (1), with $f_1(x)=1/(1+1)=\frac{1}{2}$, the evaluation value is ½.

At the next step S12, the evaluation value obtained at step S11 and the threshold value are compared and it is determined whether or not the evaluation value is equal to or larger than the threshold value. When the determined result denotes that the evaluation value is smaller than the threshold value, the flow of the processes advances to step S13. In the example of which the current dividing candidate position is position P, when the threshold value is 1, since the evaluation value at position P shown in FIG. 2 is ½, the evaluation value is smaller than the threshold value. Thus the flow of the processes advances to step S13.

At step S13, the dividing candidate position is returned for a predetermined unit. In this example of which the current dividing candidate position is position P, the dividing candidate position of moving image data of the content data 2 is returned to a position chronologically preceding position P for a predetermined unit.

For example, when the moving image data are data that have not been inter-frame compressed, the predetermined unit may be a frame. A frame immediately preceding position P becomes a new dividing candidate position. Instead, moving image data of the content data 2 may be a stream of GOPs (Group of Picture) each of which is complete and accessible by itself and is composed of at least one I (Intra-coded) picture that is decodable by itself, P (Predictive-coded) picture(s), and B (Bi-directionally predictive) picture(s), for example, according to the MPEG2 (Moving Pictures Experts Group 2) system. Each GOP starts with a predetermined code. In this case, the predetermined unit is a GOP and the dividing candidate position is returned in the unit of one GOP.

The process of step S13 is not limited to the foregoing example. In the example of which moving image data are not inter-frame compressed, the dividing candidate position may be returned for a plurality of frames. In the example of which moving image data are inter-frame compressed, the dividing candidate position may be returned for a plurality of GOPs.

After the dividing candidate position has been returned at step S13, the flow of the processes advances to step S12 where an evaluation value is calculated at the new dividing candidate position returned at step S13.

In contrast, when the determined result denotes that the evaluation value calculated at step S11 is equal to or larger than the threshold value, the flow of the processes advances to step S14 where the current dividing candidate position is set to the final dividing position Div. In other words, in the example of which an evaluation value is obtained based on the number of face images detected, when the number of face images detected becomes 0, the value of formula (1) becomes $f_1(x)=1/(0+1)=1$. Thus the evaluation value is 1, which is equal to or larger than the threshold value.

In the example shown in FIG. 2, the dividing candidate position at position P in the initial state is returned for the predetermined unit whenever the foregoing processes from step S11 to step S13 are performed. In the region that the dividing candidate position passes position $c_1$, but not position $b_2$, namely in the region between position $c_1$ and position $b_2$, no face image is detected. Since the region between position $c_1$ and position $b_2$ is not a chapter boundary, an evaluation value calculated by the foregoing formula (1) becomes 1, which is equal to or larger than the threshold value.

In the foregoing example, the formula of obtaining an evaluation value based on the number of face images detected is used as evaluation function f(x). However, the formula is not limited to this example. FIG. 6 shows examples of evaluation functions f(x) and threshold values to evaluation values calculated therefrom.

FIG. 6 show examples of evaluation functions f(x) for moving image data the following formula (2), formula (3), and formula (4) along with the foregoing formula (1). In these examples, a threshold value to an evaluation value of formulas (1) to (4) is set to 1.

$$f_2(x)=1/(\text{number of faces at dividing position}+1)+(1 \text{ at chapter boundary})+(1 \text{ at change point of number of faces detected}) \quad (2)$$

$$f_3(x)=1 \text{ at position where detection of smile face starts} \quad (3)$$

$$f_4(x)=1 \text{ when particular person is detected} \quad (4)$$

In formula (2), in the example shown in FIG. 4, in the region between position $e_1$ and position $g_2$ in which face images are detected, at position $g_1$, position $f_1$, position $e_2$, and position $f_2$ where the number of face images detected change, the evaluation value becomes 1 or more where content data can be divided.

Formula (3) and formula (4) mean that content data can be divided at a position where a smiling face or a particular person is detected. A smiling face or a particular person may be detected when a face image is detected and the meta data 11 thereof are generated. Instead, when the process of step S11 shown in FIG. 5 is performed, a smiling face or a particular person may be detected. A method of detecting a smiling face or a particular person from image data will be described later.

In general, moving image data are reproduced in synchronization with predetermined audio data. In other words, the content data 2 can contain both moving image data and audio data to be reproduced in synchronization with the moving image data. FIG. 6 also shows as examples of evaluation functions f(x) for audio data the following formula (5) and formula (6). In these examples, a threshold value to an evaluation value of formulas (5) and (6) is set to 1.

$$f_5(x)=\text{duration of sound volume of 30 dB (decibel) or less}/10 \text{ seconds} \qquad (5)$$

$$f_6(x)=1 \text{ at position where detection of laughing voice starts} \qquad (6)$$

Formula (5) means that content data can be divided when a quiet state continues in a predetermined level or below for 10 seconds or more. Formula (6) means that a position where a laughing voice is detected is a dividable position. A laughing voice can be detected by analyzing frequencies of audio data and determining whether or not they contain a predetermined frequency component having a predetermined level or higher.

FIG. 6 also shows as other examples of evaluation functions f(x) the following formula (7) and formula (8). A threshold value to an evaluation value of formula (7) and formula (8) is set to 1.

$$f_7(x)=1 \text{ when moving image data and/or audio data are at a low bit rate} \qquad (7)$$

$$f_8(x)=1 \text{ when both reproduction duration from beginning of chapter and reproduction duration chronologically returned from end of chapter are 10 minutes or more}+(1 \text{ at chapter boundary}) \qquad (8)$$

In formula (7), it is thought that when moving image data and audio data have been compression-encoded at variable bit rates, a low bit rate region of moving image data is a region where images that do not largely move and that are flat continue and a low bit rate region of audio data is a region of which sounds do not largely change, namely a quiet region or a region having less high frequency components. In such regions, content data can be divided.

Formula (8) means that dividing position Div is set such that a chapter having a too short reproduction duration is not created when a chapter is divided on the basis of the foregoing formula (1) to formula (7). With reference to FIG. 7A, FIG. 7B, FIG. 7C, and FIG. 7D, this process will be described more specifically. As exemplified in FIG. 7A, it is assumed that the content data 2 starting from chapter #1 recorded in the dubbing source record medium 1 are recorded to the dubbing destination record medium 3A. In addition, it is assumed that chapter #1 has a data amount of a reproduction duration for 1 hour and the dubbing destination record medium 3A has a record capacity of a reproduction duration for 1 hour and 20 minutes.

It is assumed that a dividing candidate position was obtained according to the processes of the flow chart shown in FIG. 5 and that the final dividing position Div was set at the position corresponding to 10 seconds of a reproduction duration starting from the beginning of chapter #2. In this case, chapter #2 is divided into chapter #2' having data for 10 seconds starting from the beginning and the rest. As exemplified in FIG. 7B, the whole chapter #1 and chapter #2' are recorded in the dubbing destination record medium 3A. The region after dividing position Div of chapter #2 of the dubbing source record medium 1 is dubbed to another record medium. Thus, the state of which one chapter is divided into a very short region and the rest and recorded to different record mediums likely impairs a user's convenience.

Figure 7A:
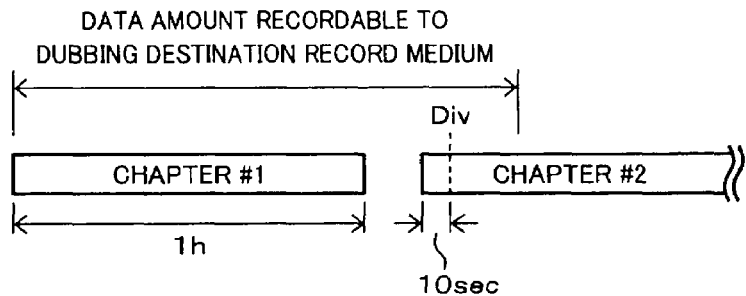
FIG. 7A, FIG. 7B, FIG. 7C, and FIG. 7D are schematic diagrams describing that the dividing position Div is restricted such that when one chapter is divided a chapter having a too short reproduction duration is prevented from being created.
Figure 7B:
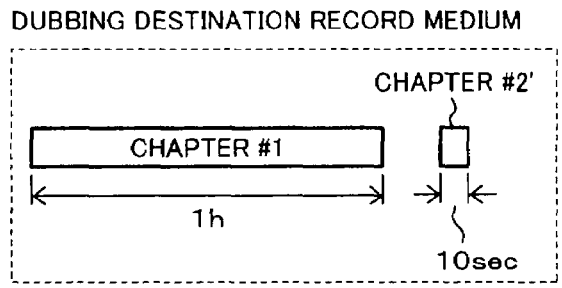
Figure 7C:
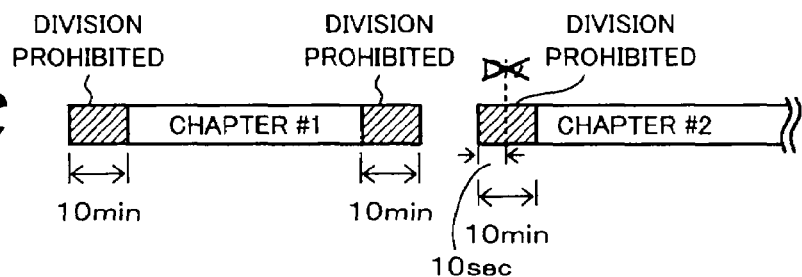
Figure 7D:
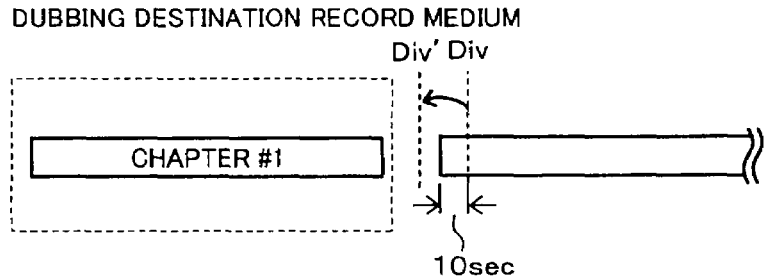

Thus, as exemplified in FIG. 7C, regions that are prohibited from being divided are set to both ends of each chapter. According to the foregoing formula (8), in the region between a position where a reproduction duration for 10 minutes elapses from the beginning of a chapter and a position where a reproduction duration for 10 minutes elapses from the end of the chapter, the evaluation value is 1. When the threshold value is, for example, 1, dividing position Div can be set in the region. When the evaluation value of the foregoing formula (8) is not 1, the evaluation value is 0. This evaluation value is ANDed with other evaluation values calculated according to other evaluating functions f(x). Thus, in the region of the reproduction duration for 10 minutes on the front side of a chapter and that on the rear side of the chapter, the evaluation value usually becomes 0. In these regions, dividing position Div is not set where content data are prohibited from being divided.

With respect to the eight types of evaluation functions $f_1(x)$ to $f_8(x)$ exemplified in FIG. 6, one of evaluation functions $f_1(x)$ to $f_7(x)$ expressed by formula (1) to formula (7), respectively, may be used. Instead, a plurality of evaluation functions $f_1(x)$ to $f_8(x)$ may be used in combination. When they are used in combination, evaluation values calculated according to the evaluation functions may be ANDed. For example, at step S12, when the determined result denotes that the evaluation value of any one of evaluation functions used in combination is equal to or larger than the threshold value, the flow of the processes advances to step S14 where the final dividing position Div is set.

Depending on the characteristic of evaluation function f(x), there may be a case that it is preferred that the final dividing position Div be slightly moved from a position where the evaluation value exceeds the threshold value. The method of setting the final dividing position Div in this case depends on the specification of the apparatus.

On the other hand, with respect to evaluation function $f_8(x)$ expressed by formula (8), as described above, the evaluation value of evaluation function $f_8(x)$ may be ANDed with the evaluation value calculated according to another evaluation function f(x). Instead, only evaluation function $f_8(x)$ may be used.

The evaluation functions shown in FIG. 6 are just exemplary. Thus other evaluation functions may be used. Evaluation functions whose evaluation objects are same, but their forms are different, may be used. In addition, the types of evaluation objects are not limited to the foregoing examples.

In addition, the evaluation values and threshold values are not limited to the foregoing examples. For example, a plurality of the foregoing evaluation functions $f_1(x)$ to $f_7(x)$ may be used in combination and the evaluation values of these evaluation functions $f_1(x)$ to $f_7(x)$ may be added. At this point, the threshold value may not be limited to 1, but larger than 1. In addition, evaluation functions $f_1(x)$ to $f_7(x)$ may be weighted in a predetermined manner.

In addition, instead of weighting the evaluation functions, evaluation objects of particular evaluation functions f(x) may be weighted. For example, in evaluation function $f_1(x)$ based on the number of face images detected, expressed as formula (1), when a plurality of different face images are identified, the face images, namely persons to be identified, may be weighted. In the example shown in FIG. 4, person E may be most weighted, whereas person G may be least weighted. Identified face images may be pre-registered and they may be pre-weighted in predetermined manners. Instead, when a dubbing process is performed, face images to be weighted may be designated.

Next, a modification of the first embodiment of the present invention will be described. In the foregoing first embodiment, while an evaluation value is being calculated according to the flow chart shown in FIG. 5 (at step S11), the calculated evaluation value is compared with the threshold value (at step S12) and the dividing candidate position is returned on the basis of the compared result (at step S13). At this point, since the evaluation value is not equal to or larger than the threshold value at the initial dividing candidate position, the dividing candidate position may be excessively returned nearly to the dubbing start position or there may be no position where the evaluation value is equal to or larger than the threshold value in the range of the data capacity of the record medium. In this case, of course, dividing position Div is unable to be set.

For example, it is assumed that evaluation function $f_1(x)$ of calculating an evaluation value based on the number of face images according to the foregoing formula (1) is used. In this case, as exemplified in FIG. 8, when moving image data contain at least one face image of a person, the evaluation value is larger than 0 and smaller than 1. In the example shown in FIG. 8, since there are face images of two persons in region h and region j, the evaluation value becomes $f_1(x)=1/(1+2)=1/3$. Since there are face images of three persons in region i, the evaluation value becomes $f_1(x)=1/(1+3)=1/4$. Since there are face images of four persons in region k and region m, the evaluation value becomes $f_1(x)=1/(1+4)=1/5$. In addition, since there is a face image of one person in region 1, the evaluation value becomes $f_1(x)=1/(1+1)=1/2$.

Figure 8:
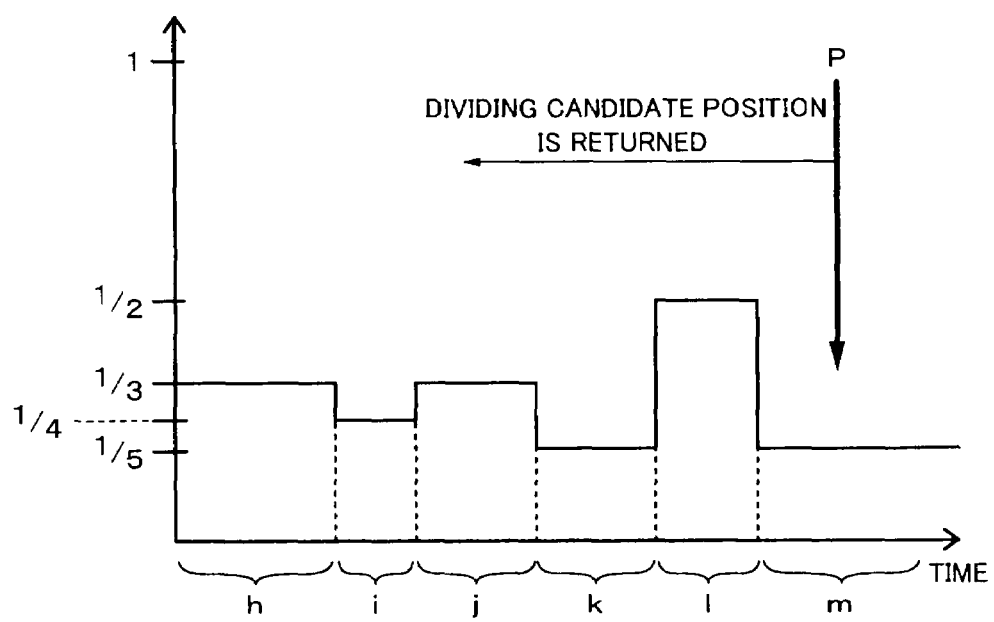
FIG. 8 is a schematic diagram describing that a dividing candidate position has been excessively returned nearly to a dubbing start position.

Thus, in the example shown in FIG. 8, the evaluation values range from 1/5 to 1/2. When the threshold value is 1, the evaluation values do not exceed the threshold value. Thus, when the dividing candidate position that is initially position P is repeatedly returned in a predetermined unit at a time according to the processes of the flow chart shown in FIG. 5, a position that can be used as the final dividing position Div is unable to be detected.

In this modification of the first embodiment, while the evaluation values are being calculated and the dividing candidate position is being returned on the basis of the calculated evaluation values, the evaluation values and the dividing candidate positions are correlatively stored in a table. When the dividing candidate position is returned for a predetermined unit, if the evaluation value does not become equal to or larger than the threshold value, with reference to the table, the position that has the highest value of the evaluation values that have been calculated, namely the most highly evaluated position is used as the final dividing position Div.

Figure 9:
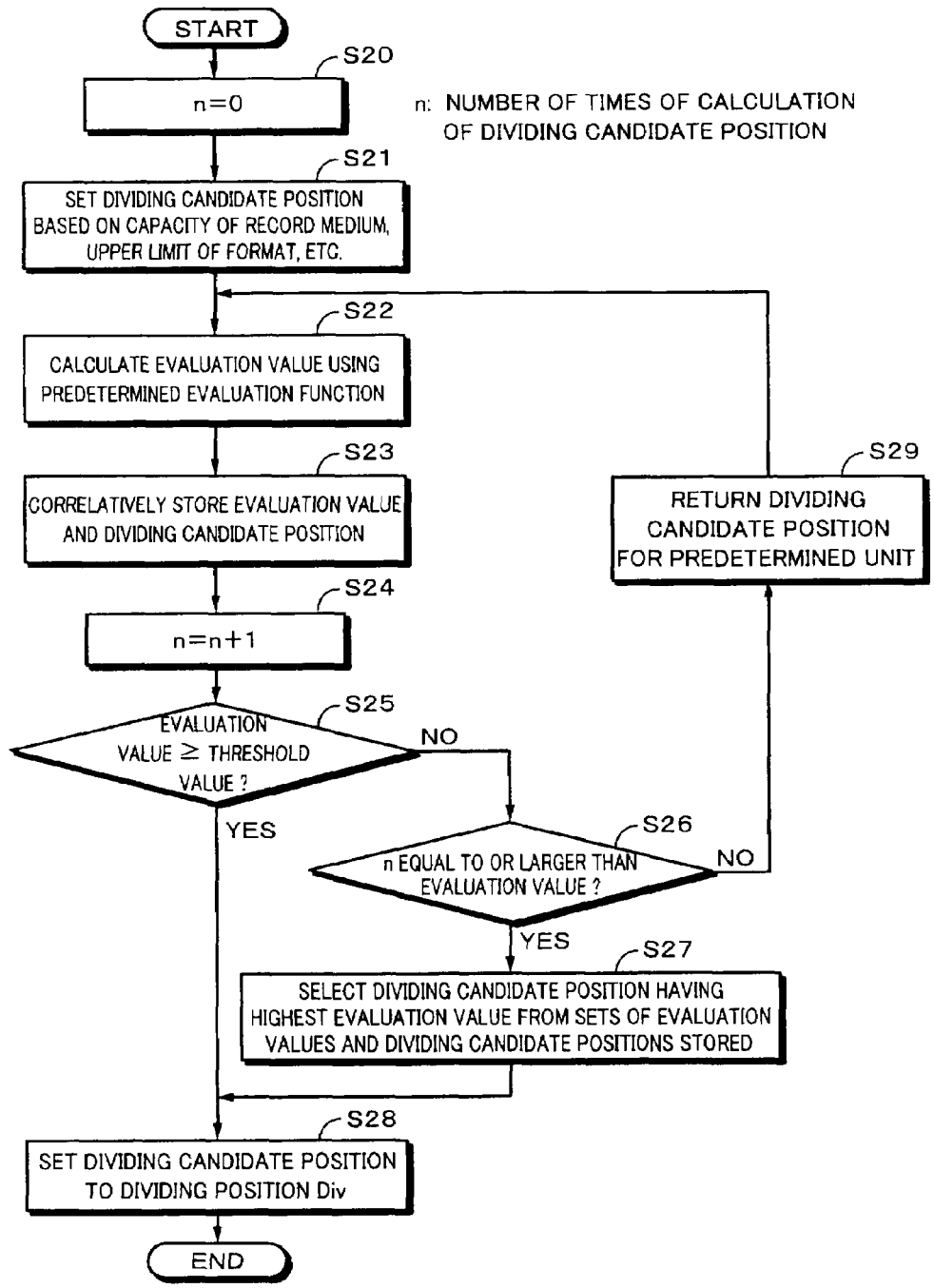
FIG. 9 is a flow chart showing an example of a setting process of dividing position Div to content data according to a modification of the first embodiment.
Figure 10:
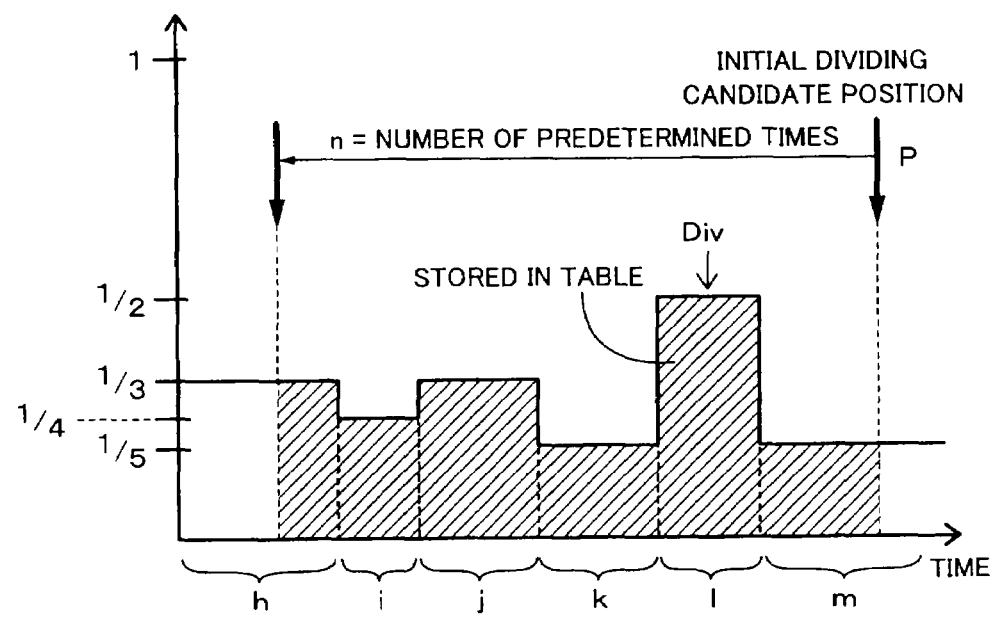
FIG. 10 is a schematic diagram showing a state of an example of evaluation values of content data in the case that evaluation function $f_1(x)$ is used.

Next, with reference to FIG. 9 and FIG. 10, an example of a process of setting dividing position Div of content data according to the modification of the first embodiment will be described. FIG. 9 is a flow chart showing an example of a process of setting dividing position Div of content data according to the modification of the first embodiment. In this example, it is assumed that the foregoing evaluation function $f_1(x)$ of obtaining an evaluation value on the basis of the number of face image detected is used and the threshold value is 1. FIG. 10 shows an example of evaluation values of content data according to evaluation function $f_1(x)$.

First, at the first step S20, the number of times of calculation of dividing candidate position n is initialized to 0. At the next step S21, the initial value of the dividing candidate position of the content data 2 is set on the basis of the record capacity of the dubbing destination record medium, the upper value defined in the format of the record medium, and so forth. Thereafter, the flow of the processes advances to step S22. In the example shown in FIG. 10, it is assumed that position P is the initial dividing candidate position.

At step S22, an evaluation value of the position that has been set as the current dividing candidate position is calculated according to evaluation function f(x). The calculated evaluation value and the current dividing candidate position are correlatively stored in the table (at step S24). Thereafter, the flow of the processes advances to step S24 where the number of times of calculation of dividing candidate position n is incremented by 1.

At the next step, the evaluation value obtained at step S22 and the threshold value are compared and it is determined whether or not the evaluation value is equal to or larger than the threshold value. When the determined result denotes that the evaluation value is equal to or larger than the threshold value, the flow of the processes advances to step S28 where the current dividing candidate position is set as the final dividing position Div.

In contrast, when the determined result denotes that the evaluation value is smaller than the threshold value, the flow of the processes advances to step S26. At step S26, it is determined whether or not the number of times of calculation of dividing candidate position n is equal to or larger than a predetermined value (for example, 100). When the determined result denotes that the number of times of calculation of dividing candidate position n is smaller than the predetermined value, the flow of the processes advances to step S29 where the dividing candidate position is returned for the predetermined unit. Thereafter, the flow of the processes returns to step S22 where an evaluation value is calculated at the new dividing candidate position returned at step S29.

In the example shown in FIG. 10, since the region preceding the initial dividing candidate position P of the content data contains face images, when evaluation function $f_1(x)$ is used, evaluation values are smaller than 1. When the threshold value is 1, the evaluation values do not exceed the threshold value. Thus the processes are repeated until the number of times of calculation of dividing candidate position n becomes the predetermined value.

In contrast, when the determined result at step S26 denotes that the number of times of calculation of dividing candidate position n is equal to or larger than the predetermined value, the flow of the processes advances to step S27. At step S27, a dividing candidate position that has the highest evaluation value is selected based on sets of evaluation values and dividing candidate positions stored in the table at step S23. Thereafter, the flow of the processes advances to the foregoing step S28 where the dividing candidate position that has been selected at step S27 is set as the final dividing position Div.

The table contains evaluation values and dividing candidate positions in the range from the initial dividing candidate position P to the dividing candidate position to which the initial dividing candidate position P is returned a predetermined number of times, namely in the range hatched in FIG. 10. At step S27, a region corresponding to the highest evaluation value is retrieved from the those stored in the table. In the example shown in FIG. 10, the evaluation value in region 1 is 1/2, which is the highest in those stored in the table. Thus, the final dividing position Div is set to region 1. A position at which dividing position Div is set in region 1 depends on the specifications and so forth of the apparatus.

In the foregoing, in the processes of the flow chart shown in FIG. 9, the process of returning the dividing candidate position is restricted on the basis of the number of times of loop from step S22 to step S26 and step S29 (the number of times of calculation of dividing candidate position n). However, this is a just example. For example, the process of returning the dividing candidate position may be restricted on the basis of the data size for which the dividing candidate position is returned or on the basis of the reproduction duration for which the dividing candidate position is returned.

Figure 11:
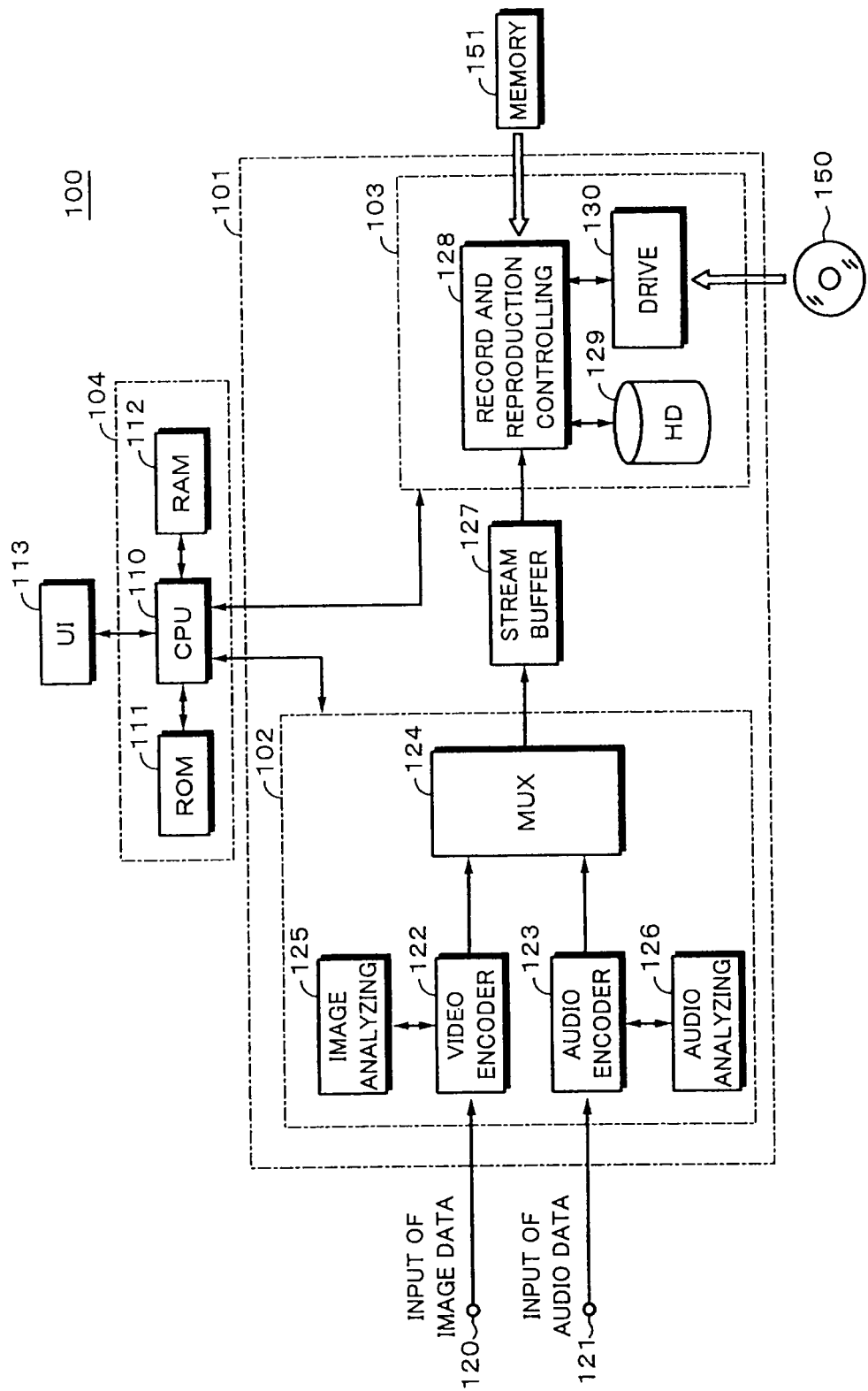
FIG. 11 is a schematic diagram showing an example of a structure of a recording apparatus according to the first embodiment of the present invention.

Next, a recording apparatus according to an embodiment of the present invention will be described. FIG. 11 shows an example of a structure of a recording apparatus 100 according to the first embodiment of the present invention. The recording apparatus 100 exemplified in FIG. 11 is structured to record moving image data and audio data that are input from the outside of the apparatus to a built-in record medium and dub moving image data and audio data recorded in the built-in record medium, for example, to another attachable/detachable record medium.

Various types of compression-encoding systems and multiplexing systems may be used. In this example, it is assumed that moving image data and audio data are compression-encoded, for example, according to the MPEG2 system and they are multiplexed, for example, according to the MPEG2 system.

The recording apparatus 100 is composed of a UI (User Interface) section 113, a recording section 101, and a controlling section 104. The recording section 101 is composed of a signal processing section 102, a stream buffer 127, and a record controlling section 103.

The controlling section 104 has, for example, a CPU (Central Processing Unit) 110, a ROM (Read Only Memory) 111, and a RAM (Random Access Memory) 112. The CPU 110 controls each section of the recording section 101 of the recording apparatus 100 through the RAM 112 as a work memory according to a program and data stored in the ROM 111. Lines that connect the controlling section 104 and each section of the recording section 101 are omitted in FIG. 11 for simplicity.

The program that runs on the CPU 110 provides a file system that is used in the recording apparatus 100. For example, the CPU 110 associates physical addresses of the record medium with files that contain data and generates logical management information of files that contain each type of data based on the file system.

The UI section 113 has switches with which the user operates the recording apparatus 100 in a predetermined manner and outputs control signals corresponding to operations of the switches. The control signals are supplied to the CPU 110. The CPU 110 controls the operation of each section of the record controlling section 103 as processes of the program corresponding to control signals supplied from the UI section 113. The UI section 113 has a simple display section and can display predetermined information, for example, information that represents a chapter to be dubbed.

For example, the CPU 110 controls the recording apparatus 100 to start and stop recording data to a hard disk 129 and to reproduce data from the hard disk 129 corresponding to operations of the UI section 113. In addition, the recording apparatus 100 sets chapters in a predetermined manner, for example, corresponding to operations of the UI section 113.

The signal processing section 102 includes a video encoder 122, an audio encoder 123, a multiplexer 124, an image analyzing section 125, and an audio analyzing section 126.

The video encoder 122 has a buffer memory that can store a plurality of frames of moving image data. The video encoder 122 compression-encodes base band moving image data that have been input through a terminal 120 with the buffer memory and outputs the compression-encoded data. In this example of which moving image data are compression-encoded according to the MPEG2 system, intra-frame compression is performed, for example, according to DCT (Discrete Cosine Transform), inter-frame compression is performed with a moving vector, and entropy encoding is performed to improve compression efficiency. Moving image data compression-encoded by the video encoder 122 are output as an MPEG2 elementary stream (ES).

The audio encoder 123 compression-encodes base band audio data that have been input through a terminal 121 and outputs the compression-encoded data. Audio data may not be compression-encoded, but base band data.

In this example, the multiplexer 124 multiplexes data, for example, according to the MPEG2 system. The multiplexer 124 time-division multiplexes compressed moving image data and audio data supplied as an MPEG2 program stream. For example, the multiplexer 124 has a buffer memory. The multiplexer 124 temporarily stores the supplied compressed moving image data and audio data in the buffer memory. The compressed moving image data stored in the buffer memory are divided into portions and headers are added thereto in a predetermined manner such that PES (Packetized Elementary Stream) packets are formed. Likewise, the compressed audio data are divided into portions and headers are added thereto such that PES packets are formed. The headers contain predetermined information defined in the MPEG2 system, such as a PTS (Presentation Time Stamp) that represents the reproduction time of data stored in the packet and a DTS (Decoding Time Stamp) that represents the decoding time. PES packets are divided into portions and contained in packs having a fixed length in a predetermined manner. Predetermined header information that represents contents of the pack is added to the pack.

The stream buffer 127 temporarily stores packs supplied from the multiplexer 124. By controlling read and write timings of packs from and to the stream buffer 127, the access speed to each record medium that will be described later and the signal process speed for encoding and so forth of audio data and moving image data are coordinated.

A record and reproduction controlling section 128 controls recording and reproducing of data to and from a plurality of record mediums. In the example shown in FIG. 11, the hard disk 129 is fixedly connected to the record and reproduction controlling section 128. In addition, a drive device 130 that records and reproduces data to and from a recordable DVD 150 (hereinafter referred to as the DVD 150) is connected to the record and reproduction controlling section 128. In addition, a memory 151 that is rewritable, nonvolatile, and attachable/detachable can be attached/detached to and from the record and reproduction controlling section 128. The record and reproduction controlling section 128 writes data to a designated address and reads data from a designated address of a designated record medium according to a command issued from an upper system, for example, the CPU 110.

In the foregoing, it was described that the hard disk 129, the drive device 130, and the memory 151 are connected to the record and reproduction controlling section 128. However, this structure is just an example. One of the hard disk 129, the drive device 130, and the memory 151 may be omitted. Instead, a plurality of drive devices 130 may be connected. Instead, a plurality of memories 150 may be connected. In the foregoing, it was described that the drive device 130 can handle a recordable DVD. Instead, the drive device 130 may handle, for example, a Blu-ray Disc (registered trademark) that has a larger capacity than the recordable DVD.

In the signal processing section 102, the image analyzing section 125 has, for example, a buffer memory. The image analyzing section 125 stores input moving image data in the buffer memory, analyzes them, and obtains various types of information about the moving image data. The image analyzing section 125 analyzes moving image data, for example, in the unit of one frame and detects face images contained in the frame images. When the image analyzing section 125 has detected a face image from a frame image, the CPU 110 obtains time information (for example, a PTS) of the frame of the face image from the multiplexer 124 and generates meta data (face information) corresponding to the face image. The generated face information is temporarily stored in the RAM 112. The processes of the image analyzing section 125 may be accomplished by a program that runs on the CPU 110.

A variety of techniques of identifying a face portion from image data and extracting characteristics of the identified face portion have been proposed and some of which have been implemented. For example, K. C. Yow and R. Cipolla "Feature-based human face detection", Image and Vision Computing, Vol. 15, No. 9, pp 713-735 (1997) describes a technique of detecting eyes, a nose, and a mouth from an image and detecting a face based on these positions. For example, eyes, a nose, and a mouth may be detected by performing a predetermined filtering process for the image data, extracting contour lines, comparing them with contour models of pupils, lips, and nostrils, and identifying their positions.

By digitizing face information, a particular face image can be extracted. For example, face information of particular persons is pre-digitized and pre-stored. After a face image is extracted from image data, the face image is digitized and compared with face information that has been digitized and stored.

Face information may be digitized in such a manner that a face information dictionary that contains various types of face patterns is prepared and position information of eyes, a nose, and a mouth of face image data of a face that the user has photographed is compared with face patterns registered in the face information dictionary. For example, face patterns registered in the face information dictionary and position information of eyes, a nose, and a mouth extracted from user's face image data are compared for their similarities, a face pattern having the largest similarity is extracted from face patterns registered in the face information dictionary, and information that represents the face pattern and similarity information are used as face characteristic data of the user. The similarity may be the difference between information based on the face information dictionary and information based on user's face image data. With the face pattern, the appearance of a smiling face or the like may be analyzed.

In the signal processing section 102, the audio analyzing section 126 has, for example, a buffer memory. The audio analyzing section 126 stores input audio data in the buffer memory, analyzes them, and obtains various types of information about audio data. The audio analyzing section 126 may analyze, for example, time, frequency, and strength of audio data, determine whether or not the audio data contain a human voice based on the analyzed result, and determine whether or not the human voice is a laughing voice. When the audio analyzing section 126 has detected a human voice or a laughing voice from audio data, the CPU 110 obtains time information (for example, a PTS) at which they have been detected from the multiplexer 124 and generates meta data corresponding to the audio data. The generated meta data are temporarily stored in the RAM 112. The processes of the audio analyzing section 126 may be accomplished by a program that runs on the CPU 110.

A person may be identified on the basis of audio data. A voiceprint pattern may be obtained by analyzing, for example, time, frequency, and strength of the foregoing audio data and a person may be identified on the basis of the voiceprint. Instead, information obtained by a technique of text-independent speaker recognition that identifies a speaker based on a particular pronunciation may be used as identification information with a user's voice. As techniques of text-independent speaker recognition, a technique using vector quantizing distortion and those using HMM (Hidden Markov Model) and GMM (Gaussian Mixture Model) have been proposed.

Next, operations of the recording apparatus 100 that has the foregoing structure will be described. In this example, it is assumed that moving image data and audio data supplied from the terminals 120 and 121 are recorded to the hard disk 129.

Base band moving image data are input from the terminal 120 to the recording section 101 and then supplied to the signal processing section 102. Thereafter, the moving image data are supplied to the video encoder 122. The video encoder 122 starts compression-encoding the supplied moving image data according to a record start command, for example, issued from the CPU 110. The video encoder 122 compression-encodes the base band moving image data and outputs them as an MPEG2 elementary stream (ES). The elementary stream is supplied to the multiplexer 124.

The image analyzing section 125 analyzes the moving image data supplied to the video encoder 122 and detects face images, for example, in the unit of one frame. Face images may be detected in the unit of a plurality of frames, rather than one frame. When a face image has been detected, for example, the CPU 110 obtains time information corresponding to the frame of the face image from the multiplexer 124 and generates face information with the time information. The generated face information is stored as meta data to the RAM 112.

Base band audio data are input from the terminal 121 to the recording section 101 and then supplied to the signal processing section 102. Thereafter, the audio data are supplied to the audio encoder 123. The audio encoder 123 starts compression-encoding the supplied audio data according to a record start command issued from the foregoing CPU 110. The audio data that have been compression-encoded by the audio encoder 123 are supplied to the multiplexer 124.

The audio analyzing section 126 analyzes, for example, time, frequency, strength, and so forth of the audio data supplied to the audio encoder 123. Based on the analyzed result, the CPU 110 determines whether or not the audio data contain a human voice. When the audio data contain a human voice, the CPU 110 determines whether or not the human voice is, for example, a laughing voice. When a human voice or a laughing voice has been detected from the audio data, the CPU 110 obtains time information corresponding to a region of the human voice or laughing voice from the multiplexer 124. The obtained information is stored as meta data of the audio data to the RAM 112.

The multiplexer 124 multiplexes the moving image data and audio data that have been compression-encoded and supplied according to a predetermined system and outputs the multiplexed data as one data stream. The multiplexer 124 has, for example, a buffer memory. The multiplexer 124 temporarily stores the supplied compressed moving image data and compressed audio data in the buffer memory.

The compressed moving image data stored in the buffer memory are divided into portions and headers are added thereto in a predetermined manner such that PES packets are formed. Likewise, the compressed audio data are divided into portions and headers are added thereto in a predetermined manner such that PES packets are formed. The headers contain predetermined information, a PTS and a DTS, defined in the MPEG2 system. PES packets are divided into portions and contained in packs having a fixed length in a predetermined manner. Packs that are output from the multiplexer 124 are temporarily stored in the stream buffer 127.

The record and reproduction controlling section 128 monitors the amount of data stored in the stream buffer 127. When data that exceeds a predetermined amount has been stored in the stream buffer 127, data are read from the stream buffer 127 in a predetermined record unit of the hard disk 129 and written to the hard disk 129. In addition, meta data corresponding to the stream data written to the hard disk 129 are read from the RAM 112. The meta data and the stream data are correlated in a predetermined manner and written to the hard disk 129. After the stream data are written to the hard disk 129, the meta data may be written to the hard disk 129.

Chapters of a video stream that is recorded can be created by placing marks on the video stream. For example, the user performs a predetermined operation for placing marks at predetermined timings corresponding to images of moving image data displayed on the monitor device (not shown) with the UI section 113. The UI section 113 outputs a control signal corresponding to the operation and supplies the control signal to the CPU 110. The CPU 110 obtains time information from the signal processing section 102 according to the control signal and stores the time information as mark information in the RAM 112. Along with the foregoing meta data, the mark information stored in the RAM 112 is associated with the stream data and written to the hard disk 129.

Next, with reference to a flow chart of FIG. 12, an example of a dubbing process for content data written in the hard disk 129 to another record medium (for example, the DVD 150) by the recording apparatus 100 will be described. First, at step S40, dubbing source content data are selected. For example, the CPU 110 obtains information of content data recorded in the hard disk 129 in a predetermined manner and causes the display device (not shown) of the UI section 113 to display the information of the content data. The information of the content data may be displayed, for example, as a list of chapters. The user performs a predetermined operation for the UI section 113 on the basis of information of the content displayed on the display device and selects dubbing source content data.

At step S41, a dubbing destination record medium, for example, the DVD 150, is loaded in the drive device 130. The CPU 110 obtains the recordable capacity of the DVD 150 loaded in the drive device 130, for example, from the file system (at step S42). At the next step, S43, the CPU 110 compares the data amount of the dubbing source content data with the recordable capacity of the DVD 150 as the dubbing destination record medium obtained at step S42.

When the determined result at step S43 denotes that the data amount of the dubbing source content data is larger than the recordable capacity of the dubbing destination record medium, it is necessary to divide the dubbing source content data such that they can be recorded to the dubbing destination record medium. Thus, the flow of the processes advances to step S44 where dividing position Div of the content data is decided according to the processes described with reference to the foregoing FIG. 5 or FIG. 9. In this example, for simplicity, it is assumed that dividing position Div is decided according to the method described with reference to FIG. 5.

In other words, the initial dividing candidate position of content data is set on the basis of the recordable capacity of the dubbing destination record medium obtained at step S42 (at step S10 of FIG. 5). Thereafter, an evaluation value for the position that has been set as the current dividing candidate position is calculated using predetermined evaluation function f(x) (at step S11 of FIG. 5), the calculated evaluation value is compared with the threshold value (at step S12 of FIG. 5), and then the dividing candidate position is returned on the basis of the compared result (at step S13 of FIG. 5). In this example, since moving image data have been compression-encoded according to the MPEG2 system, the dividing candidate position is returned, for example, in the unit of one GOP. The positions of GOPs can be obtained with a pack header, header information of PES packets, or the like.

After the dividing candidate position has been returned (at step S13 of FIG. 5), an evaluation value for the returned new dividing candidate position is calculated (at step S12 of FIG. 5).

In contrast, when the determined result denotes that the calculated evaluation value is equal to or larger than the threshold value (at step S12 of FIG. 5), the current dividing candidate position is set as the final dividing position Div (at step S14 of FIG. 5).

Figure 12:
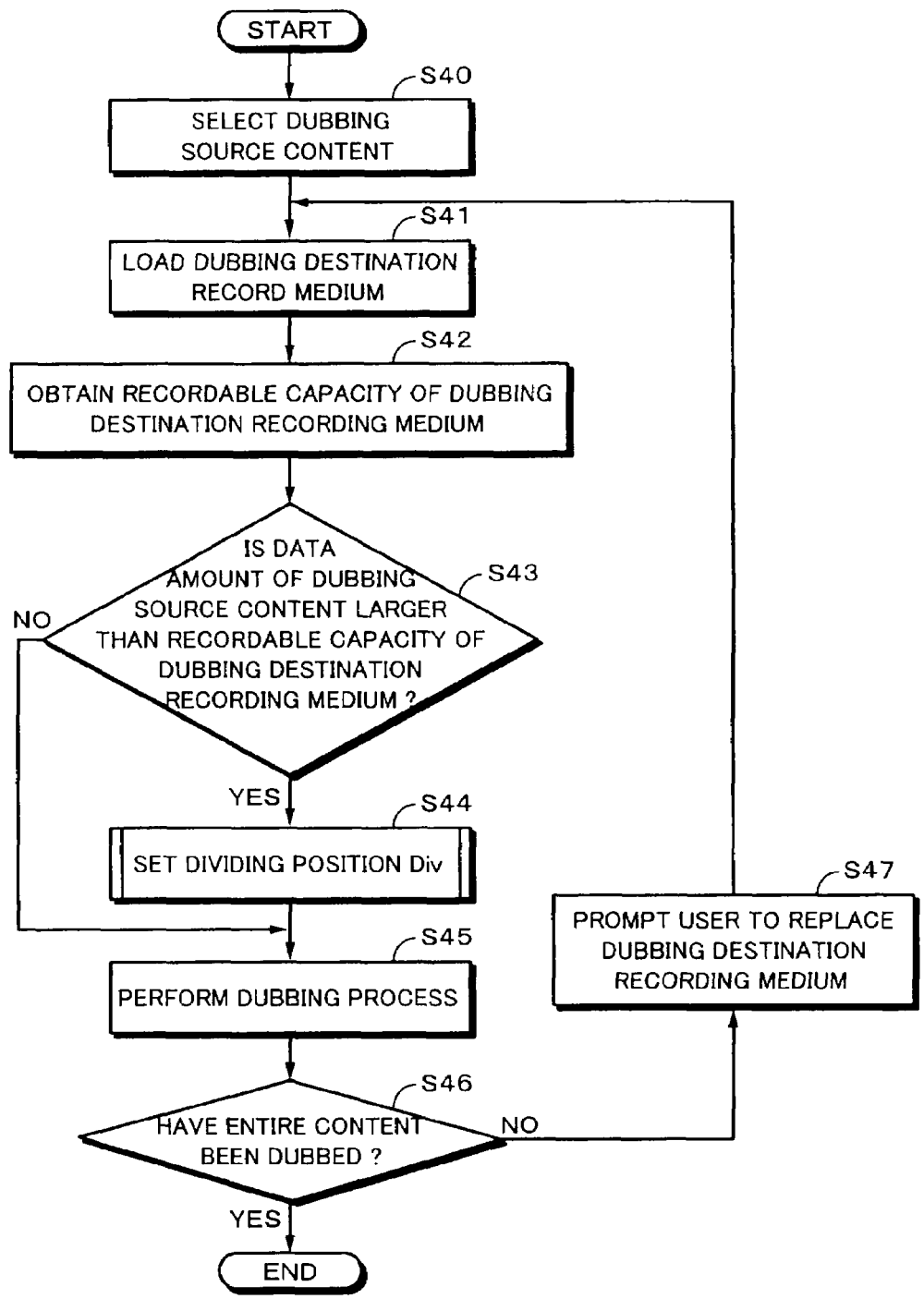
FIG. 12 is a flow chart showing an example of a dubbing process of content data written in a hard disk to another record medium.

Returning to the description of FIG. 12, after dividing position Div has been set in the foregoing manner, the flow of the processes advances to step S45 where a dubbing process is performed for content data from the hard disk 129 as the dubbing source record medium to the DVD 150 as the dubbing destination record medium. For example, the CPU 110 commands the record and reproduction controlling section 128 to read content data starting with the dubbing start position from the hard disk 129 and record the content data that have been read to the DVD 150. When the selected content data are initially dubbed, the dubbing start position is, for example, the beginning of the content data that have been selected first.

When the determined result at step S43 denotes that the data amount of the dubbing source content data is smaller than the recordable capacity of the dubbing destination record medium, the flow of the processes advances from step S43 to step S45 where the dubbing process is executed.

When the dubbing process has been complete up to dividing position Div at step S45, the flow of the processes advances to step S46 where it is determined whether or not the dubbing process for the entire content data that had been selected have been complete. When the determined result denotes that the dubbing process has been complete, the series of processes are complete.

In contrast, when the determined result denotes that the dubbing process has not been complete, namely there are data that have not been dubbed in the selected content data, the flow of the processes advances to step S47 where a message that prompts the user to change the dubbing destination record medium and continue the dubbing process. The message may be displayed, for example, on the display device (not shown) of the UI section 113.

After the user has been informed of the message at step S47, the flow of the processes returns to step S41 where the dubbing process is performed from dividing position Div at which the dubbing process has been complete at step S45 as a dubbing start position.

In the foregoing, as the encoding system according to the first embodiment of the present invention, MPEG2 was exemplified. However, the encoding system is not limited to MPEG2. In other words, according to this embodiment, another encoding system may be used as long as a stream position of moving image data can be designated in a predetermined unit and an image at a designated position can be analyzed. For example, various encoding systems such as MPEG4, H.264|AVC (ITU-T (International Telecommunication Union-Telecommunication Standardization Sector) Recommendation H.264, ISO (International Organization for Standardization)/IEC (International Electrotechnical Commission) International Standard 14496-10 (MPEG-4 part 10) (Encoding System Defined For Advanced Video Coding), Quick Time Movie (registered trademark), WMV (Windows Media Video (registered trademark)), and DivX (registered trademark) may be applied to the first embodiment of the present invention. This applies to a second embodiment and a third embodiment of the present invention that will be described later.

Next, a second embodiment of the present invention will be described. The second embodiment of the present invention is a video camera apparatus that has an image sensor and an optical system that guides light from an object to the image sensor. The video camera apparatus records video data to a record medium on the basis of an image signal captured by the image sensor.

Figure 13:
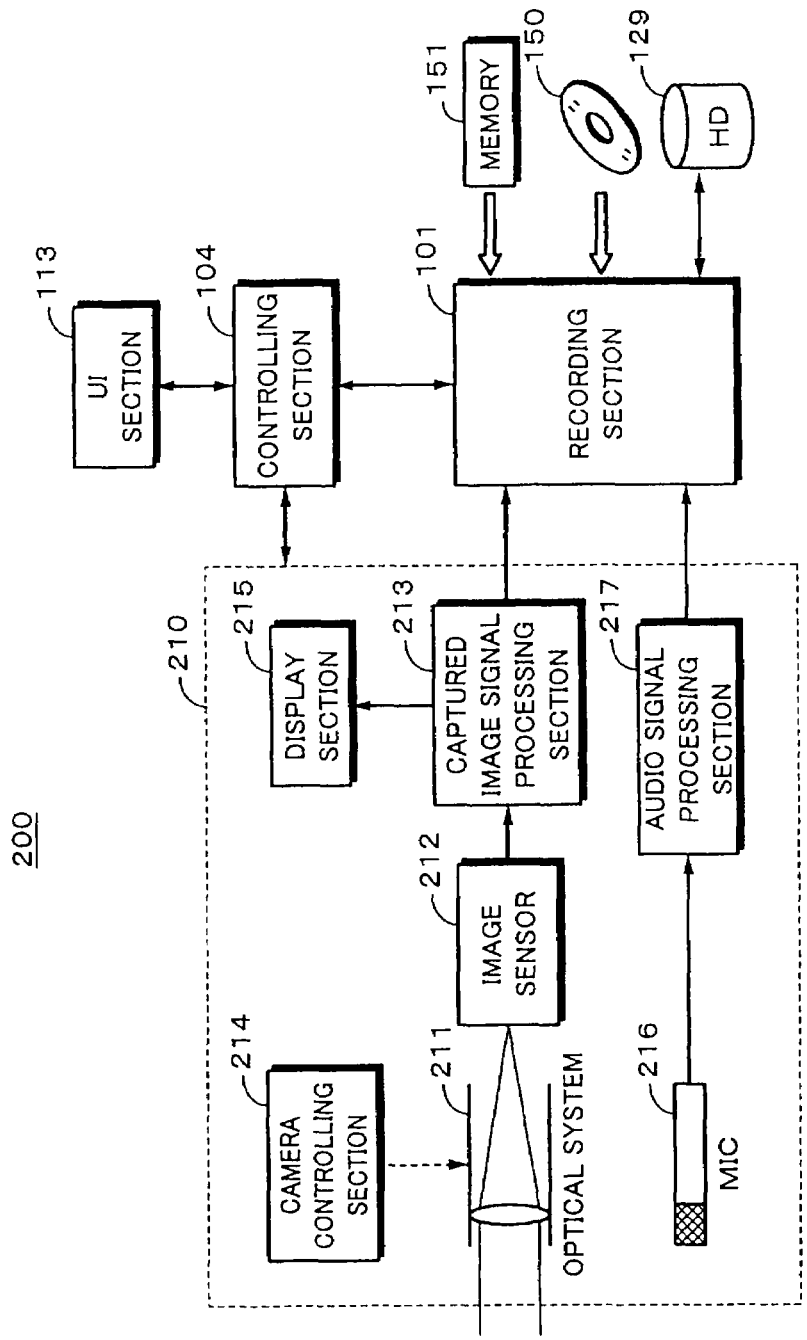
FIG. 13 is a block diagram showing an example of a structure of a video camera apparatus according to a second embodiment of the present invention.

FIG. 13 shows an example of a structure of a video camera apparatus 200 according to the second embodiment of the present invention. Since the structure of the recording apparatus 100 described with reference to FIG. 11 can be applied to the structures of a recording system, a reproducing system, and a controlling system of the video camera apparatus 200, sections in common with those of FIG. 11 will be denoted by the same reference numerals in FIG. 13 and their detailed description will be omitted.

In the structure shown in FIG. 13, a camera section 210 has sections for video signals and sections for audio signals. The sections for video signals include an optical system 211, an image sensor 212, a captured image signal processing section 213, a camera controlling section 214, and a display section 215. The sections for audio signals include a microphone (MIC) 216 and an audio signal processing section 217. The controlling section 104 exchanges various types of control signals with individual sections of the camera section 210 and controls the operations of the camera section 210 based on the control signals. In addition, the controlling section 104 controls the operations of the camera section 210 on the basis of control signals supplied from the UI section 113 corresponding to user's operations. In the video camera apparatus 200, the record start operation and the record stop operation are performed with a single record switch disposed on the UI section 113. In general, whenever the record switch is pressed, the record start operation and the record stop operation are alternately designated.

In the camera section 210, the optical system 211 has a lens system, a diaphragm adjustment mechanism, a focus adjustment mechanism, a zoom mechanism, a shutter mechanism, and so forth that guide light from an object to the image sensor 212. The operations of the diaphragm adjustment mechanism, the focus adjustment mechanism, the zoom adjustment mechanism, and the shutter mechanism are controlled by the camera controlling section 214 on the basis of control signals supplied from the controlling section 104.

The image sensor 212 is composed, for example, of a CCD (Charge Coupled Device). The image sensor 212 photo-electrically converts light radiated through the optical system 211 into an electric signal, performs a predetermined signal process for the electric signal, and outputs the resultant signal as a captured image signal. The captured image signal processing section 213 performs a predetermined signal process for the captured image signal that has been output from the image sensor and outputs the resultant signal as base band moving image data. The image sensor 212 may be composed of a CMOS (Complementary Metal-Oxide Semiconductor) imager.

For example, the captured image signal processing section 213 causes a CDS (Correlated Double Sampling) circuit to sample only a signal having image information of those that are output from the image sensor 212 and removes noise from the signal, an AGC (Automatic Gain Control) circuit to adjust the gain of the resultant signal, and an A/D converter to convert the resultant signal into a digital signal. In addition, the captured image signal processing section 213 performs a component detection signal process for the digital signal, extracts components of R (Red), G (Green), and B (Blue) from the digital signal, performs processes such as Y correction and white balance correction, and finally outputs one stream of base band moving image data.

In addition, the captured image signal processing section 213 sends information of the captured image signal that is output from the image sensor 212 to the controlling section 104. The controlling section 104 generates control signals that control the optical system 211 on the basis of the information and supplies the control signals to the camera controlling section 214. The camera controlling section 214 controls the focus adjustment mechanism, the diaphragm adjustment mechanism, and so forth based on the control signals.

In addition, the captured image signal processing section 213 generates a video signal that the display section 215 that uses, for example, an LCD (Liquid Crystal Display) as a display device, displays on the basis of the captured image signal that is output from the image sensor 212.

The microphone 216 collects surrounding sounds, converts them into an electric signal, and outputs it as an audio signal. The audio signal that is output from the microphone 216 is supplied to the audio signal processing section 217. The audio signal processing section 217 converts the supplied audio signal that is an analog signal into digital data through a limiter, performs predetermined audio signal processes such as noise suppression and audio quality correction for the audio data, and then outputs the resultant audio data as base band audio data.

The base band moving image data that are output from the captured image signal processing section 213 of the camera section 210 are supplied to the recording section 101 through the terminal 120 and then input to the video encoder 122. On the other hand, the base band audio data that are output from the audio signal processing section 217 are supplied to the recording section 101 through the terminal 121 and then input to the audio encoder 123.

When the record switch on the UI section 113 is pressed in the record stop state, a record start control signal is supplied from the UI section 113 to the controlling section 104. The base band digital video signal and audio data that are output from the camera section 210 are recorded to the hard disk 129 under the control of the controlling section 104.

In other words, as described above, moving image data and audio data are compression-encoded by the video encoder 122 and the audio encoder 123 in the predetermined manners, respectively. The moving image data and audio data that have been compression-encoded are packetized, packed, and multiplexed by the multiplexer 124 in the predetermined manners. The stream data are supplied to the record and reproduction controlling section 128 through the stream buffer 127 and recorded as content data to the hard disk 129.

The video encoder 122 and the audio encoder 123 perform the compression-encoding process for the moving image data and audio data, respectively. The image analyzing section 125 and the audio analyzing section 126 perform the analyzing process for the compression-encoded video data and audio data in predetermined manners, respectively. In other words, as described above, the image analyzing section 125 analyzes images of the moving image data. The controlling section 104 performs processes such as detecting face images from the moving image data on the basis of the analyzed result and obtaining time information that represents time of content data from which a face image has been detected. Likewise, the audio analyzing section 126 analyzes the audio data. The controlling section 104 performs processes such as extracting a human voice and a laughing voice from the audio data on the basis of the analyzed result and obtaining time information that represents content data from which these types of information have been extracted.

The controlling section 104 generates meta data corresponding to content data recorded in the hard disk 129 from information obtained on the basis of the analyzing processes by the image analyzing section 125 and the audio analyzing section 126. As the content data are recorded to the hard disk 129, the generated meta data are associated with the content data and recorded to the hard disk 129.

As the recoding operation of data to the hard disk 129 is started or stopped, marks are placed on content data to set chapters. Instead, corresponding to a predetermined user's operation to the UI section 113, marks may be placed at any timings during photographing to set chapters. Mark information is associated with content data and recorded to the hard disk 129.

The dubbing process for content data recorded in the hard disk 129 to another record medium, for example, the DVD 150 or the memory 151, is the same as that of the foregoing first embodiment. Thus its detailed description will be omitted.

Next, a third embodiment of the present invention will be described. In the third embodiment, the foregoing dubbing process is performed by a computer 300 having a standard structure outlined in FIG. 14. In other words, the foregoing dubbing process can be accomplished without necessity of having the structure for the compression-encoding process and the multiplexing process for moving image data and audio data by the video encoder 122, the audio encoder 123, and the multiplexer 124 of the recording apparatus 100 of the first embodiment.

In this case, content data composed of moving image data and/or audio data may be data generated by another device and copied to a record medium such as a hard disk of the computer 300. Meta data may be generated by the other device and copied to the computer 300. The computer 300 may analyze content data and generate meta data based on the analyzed result. In this case, the computer 300 is necessary to temporarily decode compression-encoded moving image data and audio data contained in the content data.

Figure 14:
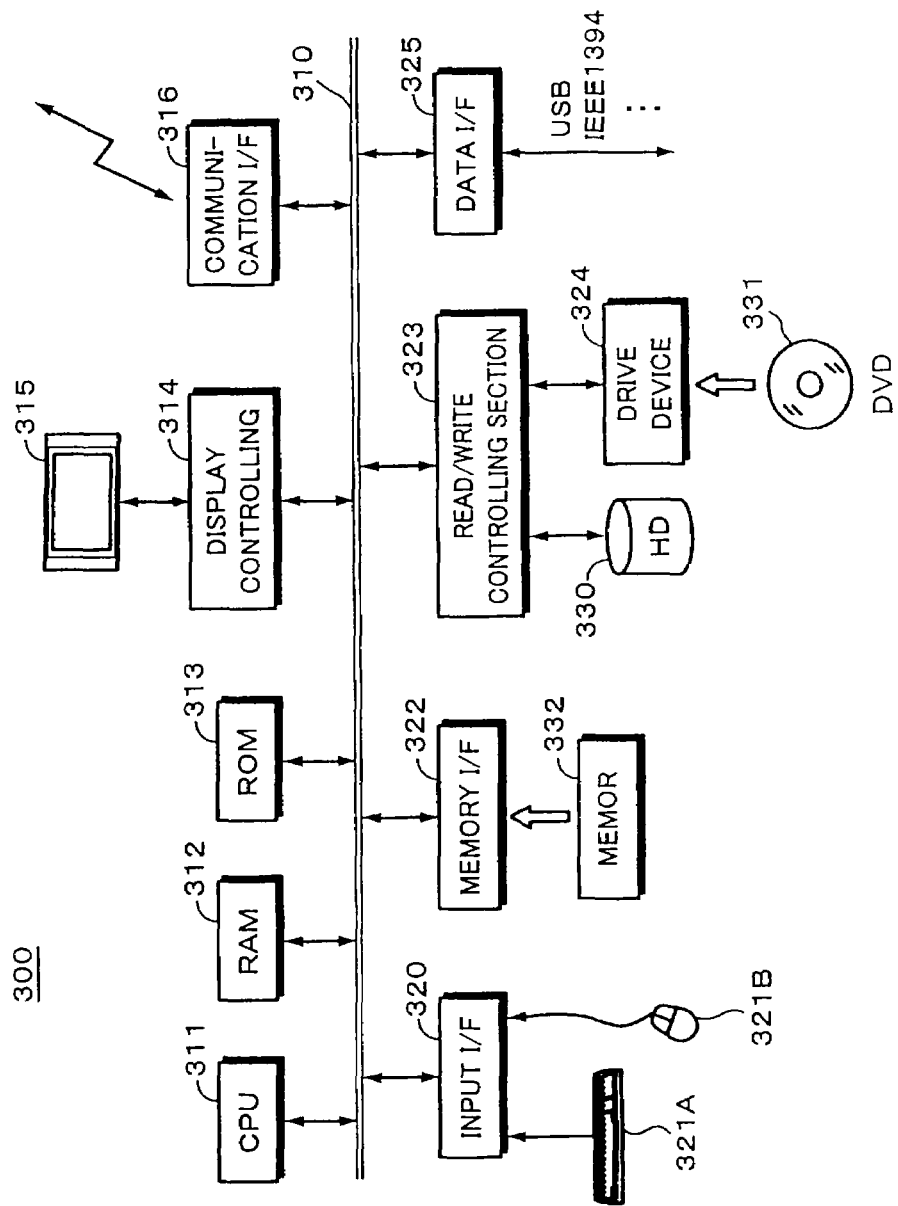
FIG. 14 is a block diagram showing an example of a structure of a regular computer.

In FIG. 14, connected to a bus 310 are a CPU 311, a RAM 312, a ROM 313, a display controlling section 314, and a communication interface (I/F) 315. In addition, connected to the bus 310 are an input I/F 320, a memory I/F 322, a read/write controlling section 333, and a data I/F 325. Connected to the input I/F 320 are input devices, for example, a keyboard 321A, a mouse 321B, and so forth. Connected to the read/write controlling section 333 are storage devices such as a hard disk 330 and a drive device 324 that reads and writes data from and to a disc-shaped record medium that has been loaded.

The CPU 311 uses the RAM 312 as a work memory. The CPU 311 controls the entire computer 300 and executes application software through the RAM 312 according to a basic program stored in the ROM 313 and a program stored in the hard disk 330. The display controlling section 314 generates a signal that can be displayed on the display 315 based on a display control signal generated by the CPU 311 according to a predetermined program and supplies the signal to the display 315. A communication I/F 316 controls communications to the outside according to a command issued from the CPU 311 on the basis of a predetermined protocol. The communication I/F 316 implements, for example, TCP/IP (Transmission Control Protocol/Internet Protocol) and so forth as communication protocols and controls communications to the Internet on the basis of a command issued from the CPU 311.

A read/write controlling section 323 controls reading and writing of data from and to the hard disk 330 and those of data to a record medium loaded in the drive device 324 according to a command issued from the CPU 311. In this example, it is assumed that the drive device 324 corresponds to, for example, a recordable DVD 331 and can read and write data from and to the DVD 331. The read/write controlling section 323 controls the operations of the hard disk 330 corresponding to an address designated by the CPU 311 and accesses the address of the hard disk 330. Likewise, the read/write controlling section 323 controls the operations of the drive device 324 corresponding to an address designated by the CPU 311 and accesses the address of the drive device 324.

The memory I/F 322 controls reading and writing of data from and to an attachable/detachable and nonvolatile memory 332. The memory I/F 322 accesses an address of the memory 332 as designated by the CPU 311.

The data I/F 325 is connected to an external device with a cable or wirelessly and exchanges data with the connected device according to a predetermined protocol. An interface standard applicable to the data I/F 325 may be a serial interface such as USB (Universal Serial Bus), IEEE 1394 (Institute Electrical and Electronics Engineers 1394), or the like. Of course, instead of these interfaces, another interface standard may be used.

Various types of programs such as OS (Operating System) that is software that provides fundamental functions such as the file system and GUI (Graphical User Interface) to the computer 300 and application software that executes the dubbing process according to the embodiments of the present invention are stored, for example, in the hard disk 330 in a predetermined manner. These programs are recorded on a record medium, for example, a CD-ROM (Compact Disc-Read Only Memory) or a DVD-ROM and supplied. When the programs are read from the drive device 324 and stored in the hard disk 330 in the predetermined manner, they can be executed. Application software for the dubbing process may be provided by a server (not shown) on the Internet. The communication I/F 316 accesses the server through the Internet according to a command issued from the CPU 311 and downloads the application software therefrom. The downloaded application software is stored in the hard disk 330 in a predetermined manner.

When a predetermined operation for the input device such as the keyboard 321A or the mouse 321B causes the application software to be executed, the OS reads a program of the application software from the hard disk 330 and maps it on the RAM 312 in a predetermined manner. The CPU 311 generates a display control signal and reads and writes commands for the read/write controlling section 323 and the memory I/F 322, accepts an input from the input device, and executes the application software according to the program mapped on the RAM 312.

Content data that have been created in a predetermined manner are input to the computer 300 having the foregoing structure. In this example, it is assumed that moving image data and audio data contained in the content data have been compression-encoded according to the MPEG2 system and multiplexed according to the MPEG systems. Meta data and mark information are input to the computer 300 along with the content data. The meta data and mark information may be contained in the content data. The content data, meta data, and mark information that have been input are stored in the hard disk 330.

Data may have been recorded, for example, to the DVD 331 in a predetermined manner and the user may be supplied therewith. Instead, data may be supplied by data communications from an external device connected to the data I/F 325 through a predetermined interface. Instead, data may be supplied by the communication I/F 316 through the Internet.

A new DVD 331 can be loaded in the drive device 324, content data stored in the hard disk 330 can be selected as chapters, and the selected chapters can be dubbed to the DVD 331. The dubbing process is performed under the control of the CPU 311 according to predetermined application software that has been started. The application software controls the dubbing process and composes a GUI that prompts the user to perform operations for the dubbing process and so forth.

The dubbing process can be executed nearly in the same manner as that of the method shown in FIG. 5 or FIG. 9 and FIG. 12 of the first embodiment under the control of the CPU 311 according to the application software. When the computer 300 performs the dubbing process, if dubbing source content data were created by another device and are supplied through a record medium such as the DVD 331 or the memory 332 or through the communication I/F 316 or the data I/F 325, meta data based on analyzed results of image data and audio data may not be present.

In this case, the CPU 311 may perform an image analyzing process and an audio analyzing process for the dubbing source content data according to the application software and generate meta data. FIG. 15 is a flow chart showing a process of setting dividing position Div performed during an image analyzing process and an audio analyzing process for dubbing source content data. The processes of the flow chart shown in FIG. 15 are executed at step S44 of the flow chart shown in the foregoing FIG. 12. In FIG. 15, processes in common with those of the flow chart shown in FIG. 5 will be denoted by the same reference letters and their detailed description will be omitted.

The initial dividing candidate position of the content data is set on the basis of the recordable capacity of the dubbing destination record medium obtained at step S42 of FIG. 12 (at step S10). The CPU 311 decodes data at the position that has been set as the dividing candidate position for the predetermined unit (at step S110). In the example of which moving image data have been compression-encoded according to the MPEG2 system, a GOP at the position that has been set as the current dividing candidate position is decoded. The decoded data are stored, for example, in the RAM 312.

At the next step, S111, the foregoing analyzing process is performed for moving image data and audio data decoded at step S110 and stored in the image sensor 212. An evaluation value is calculated according to predetermined evaluation function f(x) on the basis of the result of the analyzing process (at step S11). The calculated evaluation value is compared with the predetermined threshold value (at step S12). The dividing candidate position is returned on the basis of the compared result (at step S13). In this example, since moving image data have been compression-encoded according to the MPEG2 system, the dividing candidate position is returned, for example, in the unit of one GOP.

When the dividing candidate position has been returned (at step S13), a GOP at the new dividing candidate position is decoded (at step S110). The analyzing process is performed for the decoded moving image data and audio data (at step S111).

In this example, it was described that data are decoded and analyzed at each dividing candidate position. However, since this is just an example, when dubbing source content data are selected, the content data may be decoded and analyzed and meta data may be generated on the basis of the analyzed results. Dividing position Div is set with the meta data according to the flow charts shown in FIG. 5 or FIG. 9 and FIG. 12.

When the dubbing process is performed by the recording apparatus 100, as long as the application software is appropriate, decoded data can be dubbed regardless of compression-encoding systems, formats, and so forth of moving image data and audio data that compose content data. In other words, when the compression-encoding system of moving image data in any format can be determined and the moving image data that have been compression-encoded according to the determined compression-encoding system can be decoded, the decoded data can be analyzed. A decoder module corresponding to a predetermined compression-encoding system may be added to the application software.

In the foregoing example, the dubbing destination record medium was the DVD 331 loaded in the drive device 324. However, the dubbing destination record medium is not limited to the drive device 324. For example, the memory 332 attached to the memory I/F 322 may be a dubbing destination record medium. In addition, another device connected by the data I/F 325 through a predetermined interface may be designated as a dubbing destination. For example, a hard disk that can be controlled through a predetermined interface may be designated as a dubbing destination record medium. In addition, another device connected by the communication I/F 316 through the Internet may be designated as a dubbing destination.

It should be understood by those skilled in the art that various modifications, combinations, sub-combinations and alternations may occur depending on design requirements and other factors insofar as they are within the scope of the appended claims or the equivalents thereof.

What is claimed is:

1. A data processing apparatus which divides stream data into portions, comprising:
   a dividing candidate position obtaining section which obtains a first dividing candidate position of the stream data based on a capacity of a record medium;
   an evaluation value calculating section which calculates an evaluation value, f(x), at the first dividing candidate position of the stream data based on at least an evaluation function, f, which is defined at least by $$f(x) = \begin{cases} 1/(1+n(x)), & \text{when } x \text{ does not specify a chapter boundary} \\ 1/(2+n(x)), & \text{when } x \text{ specifies a chapter boundary,} \end{cases}$$

in which x is the first dividing candidate position and n(x) specifies a number of face images detected at the first dividing candidate position;
   a comparing section which compares the evaluation value calculated by the evaluation value calculating section with a predetermined threshold value;
   a controlling section which decides a dividing position of the stream data based on a compared result of the comparing section, wherein,
   the controlling section causes the dividing candidate position obtaining section to obtain a second dividing candidate position that precedes the first dividing candidate position when the compared result of the comparing section denotes that the evaluation value at the first dividing candidate position does not exceed the predetermined threshold value, and
   the controlling section decides the dividing position of the stream data based on the first dividing candidate position when the evaluation value at the first dividing candidate position is equal to or exceeds the predetermined threshold value.

2. The data processing apparatus as set forth in claim 1, wherein the evaluation value calculating section calculates the evaluation value based on contents of the stream data.

3. The data processing apparatus as set forth in claim 2, wherein the stream data contains moving image data and an analyzed result of the moving image data is associated with the stream data, and
the evaluation value calculating section calculates the evaluation value based on the analyzed result of the moving image data.

4. The data processing apparatus as set forth in claim 3, wherein the analyzed result is information regarding the face images contained in the moving image data, and
wherein the evaluation value calculating section calculates the evaluation value based on the information regarding the face images.

5. The data processing apparatus as set forth in claim 4, wherein the number of the face images detected at the first dividing candidate position are detected in the moving image data.

6. The data processing apparatus as set forth in claim 4, wherein the evaluation value calculating section calculates the evaluation value based on a pattern of at least one of the face images detected at the first dividing candidate position in the moving image data.

7. The data processing apparatus as set forth in claim 2, wherein the stream data contains audio data and an analyzed result of the audio data is associated with the stream data, and
the evaluation value calculating section calculates the evaluation value further based on the analyzed result of the audio data.

8. The data processing apparatus as set forth in claim 7, wherein the evaluation value calculating section calculates the evaluation value further based on a level of the audio data.

9. The data processing apparatus as set forth in claim 7, wherein the evaluation value calculating section calculates the evaluation value further based on a predetermined characteristic detected at the first dividing candidate position of the audio data.

10. The data processing apparatus as set forth in claim 1, wherein the first dividing candidate position is based on a first reproduction duration of the stream data, and the second dividing candidate position is based on a second reproduction duration of the stream data.

11. The data processing apparatus as set forth in claim 10, wherein the evaluation value calculating section calculates a second evaluation value based on the second dividing candidate position, which is based on the second reproduction duration that has elapsed from a beginning of the stream data, the first dividing candidate position being based on the first reproduction duration,
the dividing position not being in a first interval from the end of the stream data to the first reproduction duration, and
the dividing position not being in a second interval from the beginning of the stream data to the second reproduction duration.

12. The data processing apparatus as set forth in claim 1, wherein the evaluation value calculating section calculates the evaluation value further based on a bit rate of the stream data.

13. The data processing apparatus as set forth in claim 1, wherein the evaluation value calculating section calculates the evaluation value with a plurality of evaluation functions, including the evaluation function.

14. The data processing apparatus as set forth in claim 1, wherein the evaluation value calculating section weights evaluation objects of the evaluation function and calculates the evaluation value with the weighted evaluation function.

15. The data processing apparatus as set forth in claim 1, wherein the evaluation value calculating section selectively calculates evaluation values of evaluation objects of the evaluation function.

16. The data processing apparatus as set forth in claim 1, wherein, when a second evaluation value calculated based on the second dividing candidate position does not exceed the predetermined threshold, the second dividing candidate position being a predetermined length of stream data from the first dividing candidate position, the controlling section decides the dividing position as the first dividing candidate position when the evaluation value is greater than the second evaluation value and decides the dividing position as the second dividing candidate position when the second evaluation value is greater than the evaluation value.

17. The data processing apparatus as set forth in claim 1, wherein the evaluation value calculating section calculates the evaluation value further based on a detection of a particular person.

18. The data processing apparatus as set forth in claim 1, wherein the evaluation value calculating section calculates the evaluation value further based on a duration of a sound that is lower than a predetermined volume over a predetermined period of time.

19. The data processing apparatus as set forth in claim 1, wherein the evaluation value calculating section calculates the evaluation value further based on a bit rate being below a predetermined threshold.

20. A data processing method of dividing stream data into portions, comprising:
obtaining a first dividing candidate position of the stream data based on a capacity of a record medium;
calculating, by processing circuitry, an evaluation value, f(x), at the first dividing candidate position of the stream data based on at least an evaluation function, f, which is defined at least by $$f(x) = \begin{cases} 1/(1+n(x)), & \text{when } x \text{ does not specify a chapter boundary} \\ 1/(2+n(x)), & \text{when } x \text{ specifies a chapter boundary,} \end{cases}$$

in which x is the first dividing candidate position and n(x) specifies a number of face images detected at the first dividing candidate position;
comparing the evaluation value with a predetermined threshold value; and
deciding a dividing position of the stream data based on the comparing and dividing the stream data, into the portions, at the dividing position, wherein,
the deciding is performed by obtaining a second dividing candidate position that precedes the first dividing candidate position when the comparing denotes that the evaluation value at the first dividing candidate position does not exceed the predetermined threshold value, and
the deciding is performed by deciding the dividing position of the stream data based on the first dividing candidate position when the evaluation value at the first dividing candidate position is equal to or exceeds the predetermined threshold value.

21. A non-transitory computer readable recording medium on which is stored a data processing program which causes a computer to execute a data processing method of dividing stream data into portions, the data processing method comprising:

obtaining a first dividing candidate position of the stream data based on a capacity of a record medium;

calculating an evaluation value, f(x), at the first dividing candidate position of the stream data based on at least an evaluation function, f, which is defined at least by $$f(x) = \begin{cases} 1/(1+n(x)), & \text{when } x \text{ does not specify a chapter boundary} \\ 1/(2+n(x)), & \text{when } x \text{ specifies a chapter boundary,} \end{cases}$$

in which x is the first dividing candidate position and n(x) specifies a number of face images detected at the first dividing candidate position;

comparing the evaluation value with a predetermined threshold value; and deciding a dividing position of the stream data based on the comparing, wherein, the deciding is performed by obtaining a second dividing candidate position that precedes the first dividing candidate position when the comparing denotes that the evaluation value at the first dividing candidate position does not exceed the predetermined threshold value, and the deciding is performed by deciding the dividing position of the stream data based on the first dividing candidate position when the evaluation value at the first dividing candidate position is equal to or exceeds the predetermined threshold value.

22. A recording apparatus which dubs stream data recorded in a record medium to another record medium, comprising:

a reproducing section which reproduces data from a first record medium fixedly used in a housing of the recording apparatus;

a recording section which records data to a second record medium which is attachable and detachable to the recording apparatus;

a dividing candidate position obtaining section which obtains a first dividing candidate position of the stream data based on a capacity of the second record medium;

an evaluation value calculating section which sets the first dividing candidate position to stream data reproduced from the first record medium within a recordable data capacity of the second record medium and calculates an evaluation value at the first dividing candidate position of the stream data based on an evaluation function, f(x), at the first dividing candidate position of the stream data based on at least an evaluation function, f, which is defined at least by $$f(x) = \begin{cases} 1/(1+n(x)), & \text{when } x \text{ does not specify a chapter boundary} \\ 1/(2+n(x)), & \text{when } x \text{ specifies a chapter boundary,} \end{cases}$$

in which x is the first dividing candidate position and n(x) specifies a number of face images detected at the first dividing candidate position;

a comparing section which compares the evaluation value calculated by the evaluation value calculating section with a predetermined threshold value; and a controlling section which decides a dividing position of the stream data based on a compared result of the comparing section and controls the reproducing section and the recording section to dub the stream data recorded in the first record medium to the second record medium for a length corresponding to the dividing position, wherein, the controlling section causes the dividing candidate position obtaining section to obtain a second dividing candidate position that precedes the first dividing candidate position of the stream data when the compared result of the comparing section denotes that the evaluation value at the first dividing candidate position does not exceed the predetermined threshold value, and the controlling section decides the dividing position of the stream data based on the first dividing candidate position when the evaluation value at the first dividing candidate position is equal to or exceeds the predetermined threshold value.

23. The recording apparatus as set forth in claim 22, wherein the evaluation value calculating section calculates the evaluation value based on contents of the stream data.

24. The recording apparatus as set forth in claim 23, wherein the stream data contains moving image data and an analyzed result of the moving image data is associated with the stream data and recorded to the first record medium, and the evaluation value calculating section calculates the evaluation value based on the analyzed result of the moving image data.

25. The recording apparatus as set forth in claim 24, wherein the analyzed result is information regarding the face images contained in the moving image data, and wherein the evaluation value calculating section calculates the evaluation value based on the information regarding the face images.

26. The recording apparatus as set forth in claim 25, wherein the number of the face images detected at the first dividing candidate position are detected in the moving image data.

27. The recording apparatus as set forth in claim 25, wherein the evaluation value calculating section calculates the evaluation value based on a pattern of at least one of the face images detected at the first dividing candidate position in the moving image data.

28. The recording apparatus as set forth in claim 23, wherein the stream data contains audio data and an analyzed result of the audio data is associated with the stream data and recorded in the first record medium, and the evaluation value calculating section calculates the evaluation value further based on the analyzed result of the audio data.

29. The recording apparatus as set forth in claim 28, wherein the evaluation value calculating section calculates the evaluation value further based on a level of the audio data.

30. The recording apparatus as set forth in claim 28, wherein the evaluation value calculating section calculates the evaluation value further based on a predetermined characteristic detected at the first dividing candidate position of the audio data.

31. The recording apparatus as set forth in claim 22, wherein the first dividing candidate position is based on a first reproduction duration of the stream data, and the second dividing candidate position is based on a second reproduction duration of the stream data.

32. The recording apparatus as set forth in claim 31, wherein the evaluation value calculating section calculates a second evaluation value based on the second dividing candidate position, which is based on the second reproduction duration that has elapsed from a beginning of the stream data, the first dividing candidate position being based on the first reproduction duration, the dividing position not being in a first interval from the end of the stream data to the first reproduction duration, and the dividing position not being in a second interval from the beginning of the stream data to the second reproduction duration.

33. The recording apparatus as set forth in claim 22, wherein the evaluation value calculating section calculates the evaluation value further based on a bit rate of the stream data.

34. The recording apparatus as set forth in claim 22, wherein the evaluation value calculating section calculates the evaluation value with a plurality of evaluation functions, including the evaluation function.

35. The recording apparatus as set forth in claim 22, wherein the evaluation value calculating section weights evaluation objects of the evaluation function and calculates the evaluation value with the weighted evaluation function.

36. The recording apparatus as set forth in claim 22, wherein the evaluation value calculating section selectively calculates evaluation values of evaluation objects of the evaluation function.

37. The recording apparatus as set forth in claim 22, wherein, when a second evaluation value calculated based on the second dividing candidate position does not exceed the predetermined threshold, the second dividing candidate position being a predetermined length of stream data from the first dividing candidate position, the controlling section decides the dividing position as the first dividing candidate position when the evaluation value is greater than the second evaluation value and decides the dividing position as the second dividing candidate position when the second evaluation value is greater than the evaluation value.

38. A recording method of dubbing stream data recorded in a record medium to another record medium, comprising:
    reproducing data from a first record medium fixedly used in a housing;
    recording data to a second record medium which is attachable and detachable;
    obtaining a first dividing candidate position of the stream data based on a capacity of the second record medium;
    setting the first dividing candidate position to stream data reproduced from the first record medium within a recordable data capacity of the second record medium and calculating an evaluation value, f(x), at the first dividing candidate position of the stream data based on at least an evaluation function, f, which is defined at least by $$f(x) = \begin{cases} 1/(1+n(x)), & \text{when } x \text{ does not specify a chapter boundary} \\ 1/(2+n(x)), & \text{when } x \text{ specifies a chapter boundary,} \end{cases}$$

in which x is the first dividing candidate position and n(x) specifies a number of face images detected at the first dividing candidate position;
comparing the evaluation value with a predetermined threshold value; and
deciding a dividing position of the stream data based on the comparing and controlling the reproducing and the recording to dub the stream data recorded in the first record medium to the second record medium for a length corresponding to the dividing position, wherein,
the deciding is performed by obtaining a second dividing candidate position that precedes the first dividing candidate position of the stream data when the compared result at the comparing denotes that the evaluation value at the first dividing candidate position does not exceed the predetermined threshold value, and
the deciding is performed by deciding the dividing position of the stream data based on the first dividing candidate position when the evaluation value at the first dividing candidate position is equal to or exceeds the predetermined threshold value.

39. A non-transitory computer readable storage medium on which is stored a recording program which causes a computer to execute a recording method of dubbing stream data recorded in a record medium to another record medium, the recording method comprising:
    reproducing data from a first record medium fixedly used in a housing;
    recording data to a second record medium which is attachable and detachable;
    obtaining a first dividing candidate position of the stream data based on a capacity of the second record medium;
    setting the first dividing candidate position to stream data reproduced from the first record medium within a recordable data capacity of the second record medium and calculating an evaluation value, f(x), at the first dividing candidate position of the stream data based on at least an evaluation function, f, which is defined at least by $$f(x) = \begin{cases} 1/(1+n(x)), & \text{when } x \text{ does not specify a chapter boundary} \\ 1/(2+n(x)), & \text{when } x \text{ specifies a chapter boundary,} \end{cases}$$

in which x is the first dividing candidate position and n(x) specifies a number of face images detected at the first dividing candidate position;
comparing the evaluation value with a predetermined threshold value; and
deciding a dividing position of the stream data based on the comparing and controlling the reproducing and the recording to dub the stream data recorded in the first record medium to the second record medium for a length corresponding to the dividing position, wherein,
the deciding is performed by obtaining a second dividing candidate position that precedes the first dividing candidate position of the stream data when the compared result at the comparing denotes that the evaluation value at the first dividing candidate position does not exceed the predetermined threshold value, and
the deciding is performed by deciding the dividing position of the stream data based on the first dividing candidate position when the evaluation value at the first dividing candidate position is equal to or exceeds the predetermined threshold value.

* * * * *